(12) United States Patent
Nagayama

(10) Patent No.: US 11,017,382 B2
(45) Date of Patent: May 25, 2021

(54) PAYMENT PROCESSING SYSTEM, PAYMENT TERMINAL, COMMUNICATION DEVICE, PAYMENT SERVER, AND PAYMENT PROCESSING METHOD

(71) Applicant: Sony Corporation, Tokyo (JP)

(72) Inventor: Tomohiko Nagayama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 1334 days.

(21) Appl. No.: 14/381,826

(22) PCT Filed: Feb. 18, 2013

(86) PCT No.: PCT/JP2013/053827
§ 371 (c)(1),
(2) Date: Aug. 28, 2014

(87) PCT Pub. No.: WO2013/132995
PCT Pub. Date: Sep. 12, 2013

(65) Prior Publication Data
US 2015/0073994 A1    Mar. 12, 2015

(30) Foreign Application Priority Data
Mar. 7, 2012  (JP) .............................. JP2012-050273

(51) Int. Cl.
*G06Q 20/38*     (2012.01)
*G06Q 20/20*     (2012.01)
(Continued)

(52) U.S. Cl.
CPC ........... *G06Q 20/382* (2013.01); *G06Q 20/02* (2013.01); *G06Q 20/204* (2013.01);
(Continued)

(58) Field of Classification Search
CPC .... G06Q 20/327; G06Q 20/382; G06Q 20/02; G06Q 20/204; G06Q 20/322; G06Q 20/3278; H04L 67/10
See application file for complete search history.

(56) References Cited

U.S. PATENT DOCUMENTS 6,327,578 B1 * 12/2001 Linehan ................. G06Q 20/02
                                                          705/65
7,103,575 B1 *  9/2006 Linehan ................. G06Q 20/12
                                                          235/379
(Continued)

FOREIGN PATENT DOCUMENTS

JP      2003-051780 A    2/2003
JP      2004-185253 A    7/2004
(Continued)

OTHER PUBLICATIONS

Asai, Masanari; "Communication Terminal, User Data Transfer System, and User Data Transfer Method"; Oct. 25, 2007; document 'JP_2007281948_-_Google_Translation.pdf'; Pertinent pp. 1-17 (Year: 2007).*

(Continued)

*Primary Examiner* — Patrick McAtee
*Assistant Examiner* — Edgar R Martinez-Hernandez
(74) *Attorney, Agent, or Firm* — Chip Law Group

(57) ABSTRACT

Provided is a payment processing system for executing payment processing by transmitting and receiving payment data between a payment terminal and a payment server via a communication device, the payment terminal not including a dedicated network device for communication with the payment server, the payment data including at least payment amount information and service information to which a payment is to be executed. The payment terminal includes a payment data generation section configured to generate first payment data in which the payment amount information is (Continued)

encrypted, and a terminal communication unit configured to transmit the generated first payment data to the communication device by short range communication.

10 Claims, 14 Drawing Sheets

(51) Int. Cl.
*G06Q 20/32* (2012.01)
*G06Q 20/02* (2012.01)
*H04L 29/08* (2006.01)

(52) U.S. Cl.
CPC ......... *G06Q 20/322* (2013.01); *G06Q 20/327* (2013.01); *G06Q 20/3278* (2013.01); *H04L 67/10* (2013.01)

(56) References Cited

U.S. PATENT DOCUMENTS

| | | | | |
|---|---|---|---|---|
| 7,110,792 B2* | 9/2006 | Rosenberg | G06Q 20/341 | 455/558 |
| 8,316,237 B1* | 11/2012 | Felsher | H04L 9/0825 | 713/171 |
| 8,364,793 B2* | 1/2013 | Asai | G06Q 20/363 | 709/221 |
| 9,672,508 B2* | 6/2017 | Aabye | G06Q 20/20 | |
| 2001/0000808 A1* | 5/2001 | Lesley | G06Q 20/10 | 705/39 |
| 2003/0130904 A1* | 7/2003 | Katz | G06Q 30/0267 | 705/26.41 |
| 2004/0218741 A1* | 11/2004 | Welton | H04M 17/026 | 379/114.2 |
| 2005/0216421 A1* | 9/2005 | Barry | G06F 16/972 | 705/64 |
| 2009/0125429 A1* | 5/2009 | Takayama | G06Q 20/327 | 705/35 |
| 2012/0130903 A1* | 5/2012 | Dorsey | G06F 21/6209 | 705/71 |
| 2013/0006847 A1* | 1/2013 | Hammad | G06Q 20/32 | 705/39 |
| 2013/0036048 A1* | 2/2013 | Campos | G06Q 20/36 | 705/41 |
| 2013/0097078 A1* | 4/2013 | Wong | G06Q 20/027 | 705/44 |
| 2013/0103584 A1* | 4/2013 | Eichner | G06Q 20/4014 | 705/44 |
| 2013/0304648 A1* | 11/2013 | O'Connell | G06Q 20/3821 | 705/44 |
| 2014/0108263 A1* | 4/2014 | Ortiz | G06Q 20/3223 | 705/71 |
| 2014/0222599 A1* | 8/2014 | Wang | G06Q 20/027 | 705/21 |
| 2014/0249943 A1* | 9/2014 | Hicks | G06Q 20/204 | 705/17 |
| 2014/0279546 A1* | 9/2014 | Poole | G06Q 20/3227 | 705/44 |
| 2014/0372308 A1* | 12/2014 | Sheets | G06Q 20/32 | 705/44 |
| 2015/0319158 A1* | 11/2015 | Kumnick | H04L 67/02 | 726/9 |
| 2016/0086164 A1* | 3/2016 | Griffin | H04W 12/06 | 705/71 |
| 2017/0206524 A1* | 7/2017 | Sheets | G06Q 20/40 | |

FOREIGN PATENT DOCUMENTS

| | | | | | |
|---|---|---|---|---|---|
| JP | 2004185253 A | * | 7/2004 | | G06F 17/60 |
| JP | 2007-241448 A | | 9/2007 | | |
| JP | 2007241448 A | * | 9/2007 | | G06Q 40/00 |
| JP | 2007-281948 A | | 10/2007 | | |
| JP | 2007281948 A | * | 10/2007 | | G06Q 20/32 |
| JP | 2011-118789 A | | 6/2011 | | |
| JP | 2011118789 A | * | 6/2011 | | G06Q 20/00 |
| JP | 2011-141853 A | | 7/2011 | | |

OTHER PUBLICATIONS

"Authentication and services access control in a cooperative ad hoc environment"; Hassnaa Moustafa; Gilles Bourdon; 5th International Conference on Broadband Communications, Networks and Systems; (Year: 2008).*

"Card-based Macro payment for Mobile Phones"; Philip Garner, Reuben Edwards, Paul Coulton; 2006 International Conference on Mobile Business; (Year: 2006).*

"Research on Security of Mobile Payment Model Based on Trusted Third Party"; Wei Feifei; 2010 Second International Conference on Networks Security, Wireless Communications and Trusted Computing; (Year: 2010).*

"Authentication and Authorization Method in Multidomain, Multi-provider Networks"; Silvana Greco Polito, Henning Schulzrinne; (Year: 2007).*

"An Authentication Model Involving Trusted Third Party for M-Commerce"; Mingqiu Song, Xiangpei Hu, Jiahua Li, Guishi Deng; Sixth International Conference on the Management of Mobile Business (ICMB 2007) (Year: 2007).*

International Search Report from International Publication PCT/JP2013/053827 dated Mar. 19, 2013.

* cited by examiner

FIG.3

PAYMENT DATA Da

| PAYMENT TERMINAL ID | SERVER ID | PAYMENT EXECUTION ID | PAYMENT AMOUNT | PORTABLE TERMINAL ID | PORTABLE TERMINAL SERVER DATA | SIGNATURE VALUE BY PAYMENT TERMINAL | SERVICE ID LIST | PAYMENT AMOUNT | ADDITIONAL INFORMATION 11 |

ENCRYPTED WITH SERVER KEY

FIG.5

PAYMENT DATA Db

| PAYMENT TERMINAL ID | SERVER ID | PAYMENT EXECUTION ID | PAYMENT AMOUNT | PORTABLE TERMINAL ID | PORTABLE TERMINAL SERVER DATA | SIGNATURE VALUE BY PAYMENT TERMINAL | SERVICE ID | PAYMENT AMOUNT | ADDITIONAL INFORMATION I2 |

ENCRYPTED WITH SERVER KEY

FIG.6

PAYMENT DATA Dc

| PAYMENT TERMINAL ID | SERVER ID | PAYMENT EXECUTION ID | PAYMENT AMOUNT | PORTABLE TERMINAL ID | BALANCE | SIGNATURE VALUE BY SERVER | ADDITIONAL INFORMATION I3 |

ENCRYPTED WITH PAYMENT TERMINAL KEY

PAYMENT PROCESSING SYSTEM, PAYMENT TERMINAL, COMMUNICATION DEVICE, PAYMENT SERVER, AND PAYMENT PROCESSING METHOD

CROSS-REFERENCE TO RELATED APPLICATION

The present application is a national phase entry under 35 U.S.C. § 371 of International Application No. PCT/JP2013/053827 filed Feb. 18, 2013, published on Sep. 12, 2013 as WO 2013/132995 A1, which claims priority from Japanese Patent Application No. JP 2012-050273, filed in the Japanese Patent Office on Mar. 7, 2012.

TECHNICAL FIELD

The present disclosure relates to a payment processing system, a payment terminal, a communication device, a payment server, and a payment processing method.

BACKGROUND ART

In recent years, electronic money systems that enable a buyer to make a payment with electronic money instead of cash for the price of a service are becoming widespread. In this electronic money system, the payment processing is executed by transmitting and receiving payment data between a payment terminal of a store that provides a service and a payment server of a business operator of the electronic money system, for example.

In the below Patent Literature 1, payments in off-line transaction such as an expense during shopping, an expense for service price, an expense at an automatic vending machine, and an expense for taxi fare, are disclosed. Specifically, there is disclosed a payment method in which using points and making payments is enabled by simple manipulation of just holding a portable terminal over a short range wireless communication device dedicated for payment, without bringing cash, a credit card, a point card, or the like at the time of payment.

CITATION LIST

Patent Literature

Patent Literature 1: JP 2011-141853A

SUMMARY OF INVENTION

Technical Problem

However, in the technology of Patent Literature 1, in view of prevention of falsification of transaction data and the like, the client terminal is provided with a dedicated network device for communication with the payment server. If the network device like this is provided, the configuration of the client terminal becomes complicated, and the cost rises.

Therefore, the present disclosure proposes a secure and versatile payment method, using a payment terminal not having a dedicated network device for communication with the payment server.

Solution to Problem

According to the present disclosure, there is provided a payment processing system for executing payment processing by transmitting and receiving payment data between a payment terminal and a payment server via a communication device, the payment terminal not including a dedicated network device for communication with the payment server, the payment data including at least payment amount information and service information to which a payment is to be executed. The payment terminal includes a payment data generation section configured to generate first payment data in which the payment amount information is encrypted, and a terminal communication unit configured to transmit the generated first payment data to the communication device by short range communication. The communication device includes a first device communication unit configured to receive the first payment data from the payment terminal by the short range communication, and a second device communication unit configured to transmit second payment data based on the first payment data received from the payment terminal, via a network to the payment server. The payment server includes a server communication unit configured to receive the second payment data from the communication device via the network, and a payment processing section configured to decode the second payment data received from the communication device and execute payment processing. The server communication unit transmits third payment data including at least balance information encrypted after payment, via the network to the communication device. The first device communication unit transmits, to the payment terminal by the short range communication, fourth payment data based on the third payment data after payment which is received from the payment server by the second device communication unit.

According to such a configuration, the payment terminal generates first payment data in which the payment amount information is encrypted, and transmits the generated first payment data by short range communication to the communication device. The communication device transmits second payment data based on the first payment data received from the payment terminal by the short range communication, via a network to the payment server. The payment server decodes the second payment data received from the communication device via the network, executes payment processing, and transmits third payment data including at least balance information encrypted after payment, via the network to the communication device. Then, the communication device transmits fourth payment data based on the third payment data received from the payment server, by the short range communication to the payment terminal. Thereby, the payment data is transmitted and received via the communication device between the payment terminal and the payment server, without a network device provided in the payment terminal. Also, since the encrypted payment data is transmitted and received, the encrypted information is prevented from falsification. Accordingly, a secure and versatile payment method is realized using the payment terminal not having a dedicated network device for communication with the payment server.

According to the present disclosure, there is provided a payment terminal in a payment processing system for executing payment processing, the payment terminal being configured to transmit payment data to and receive payment data from a payment server via a communication device, the payment terminal not including a dedicated network device for communication with the payment server, the payment data including at least payment amount information and service information to which a payment is to be executed, the payment terminal including a payment data generation section configured to generate first payment data in which the payment amount information is encrypted, and a terminal communication unit configured to transmit the generated first payment data to the communication device by short range communication. After the payment server receives second payment data based on the first payment data from the communication device, decodes the second payment data, and executes payment processing, the terminal communication unit receives fourth payment data based on third payment data including at least encrypted balance information, from the communication device by the short range communication.

According to the present disclosure, there is provided a communication device in a payment processing system for executing payment processing, the communication device being configured to transmit and receive payment data between a payment terminal and a payment server, the payment terminal not including a dedicated network device for communication with the payment server, the payment data including at least payment amount information and service information to which a payment is to be executed, the communication device including a first device communication unit configured to receive first payment data generated by encrypting the payment amount information at the payment terminal, from the payment terminal by short range communication, and a second device communication unit configured to transmit second payment data based on the first payment data received from the payment terminal, via a network to the payment server. After the payment server decodes the transmitted second payment data and executes payment processing, the second device communication unit receives third payment data including at least encrypted balance information via the network from the payment server. The first device communication unit transmits fourth payment data based on the third payment data received from the payment server, to the payment terminal by the short range communication.

According to the present disclosure, there is provided a payment server in a payment processing system for executing payment processing, the payment server being configured to transmit payment data to and receive payment data from a payment terminal via a communication device, the payment terminal not including a dedicated network device for communication with the payment server, the payment data including at least payment amount information and service information to which a payment is to be executed, the payment server including a server communication unit configured to receive second payment data based on first payment data generated by encrypting the payment amount information at the payment terminal, from the communication device via a network, and a payment processing section configured to decode the second payment data received from the communication device and execute payment processing. The server communication unit transmits third payment data including at least balance information encrypted after payment, via the network to the communication device.

According to the present disclosure, there is provided a payment processing method for executing payment processing by transmitting and receiving payment data including at least payment amount information and service information to which a payment is to be executed, via a communication device between a payment server and a payment terminal not including a dedicated network device for communication with the payment server, the payment processing method including generating, by the payment terminal, first payment data in which the payment amount information is encrypted, transmitting, by the payment terminal, the generated first payment data to the communication device by short range communication, transmitting, by the communication device, second payment data based on the first payment data received from the payment terminal by the short range communication, via a network to the payment server, decoding, by the payment server, the second payment data received from the communication device via the network, and executing payment processing, transmitting, by the payment server, third payment data including at least balance information encrypted after payment via the network to the communication device, and transmitting, by the communication device, fourth payment data based on the third payment data received from the payment server, to the payment terminal by the short range communication.

According to the present disclosure, there is provided a payment processing method for executing payment processing by transmitting and receiving payment data including at least payment amount information and service information to which a payment is to be executed, via a communication device between a payment server and a payment terminal not including a dedicated network device for communication with the payment server, the payment processing method including receiving, by the communication device, first payment data generated by encrypting the payment amount information at the payment terminal, from the payment terminal by short range communication, transmitting, by the communication device, second payment data based on the first payment data received from the payment terminal, via a network to the payment server, receiving, by the communication device, third payment data including at least encrypted balance information via the network from the payment server, after the payment server decodes the transmitted second payment data and executes payment processing, and transmitting, by the communication device, fourth payment data based on the third payment data received from the payment server, to the payment terminal by the short range communication.

Advantageous Effects of Invention

As described above, according to the present disclosure, a secure and versatile payment method is realized using the payment terminal not having a dedicated network device for communication with the payment server.

BRIEF DESCRIPTION OF DRAWINGS

FIG. 3 is a diagram illustrating one example of payment data Da generated by a payment data generation section according to the first embodiment.

FIG. 5 is a diagram illustrating one example of payment data Db which is to be processed by a payment data processing section according to the first embodiment.

FIG. 6 is a diagram illustrating one example of payment data Dc received from a payment server according to the first embodiment.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Figure 1:
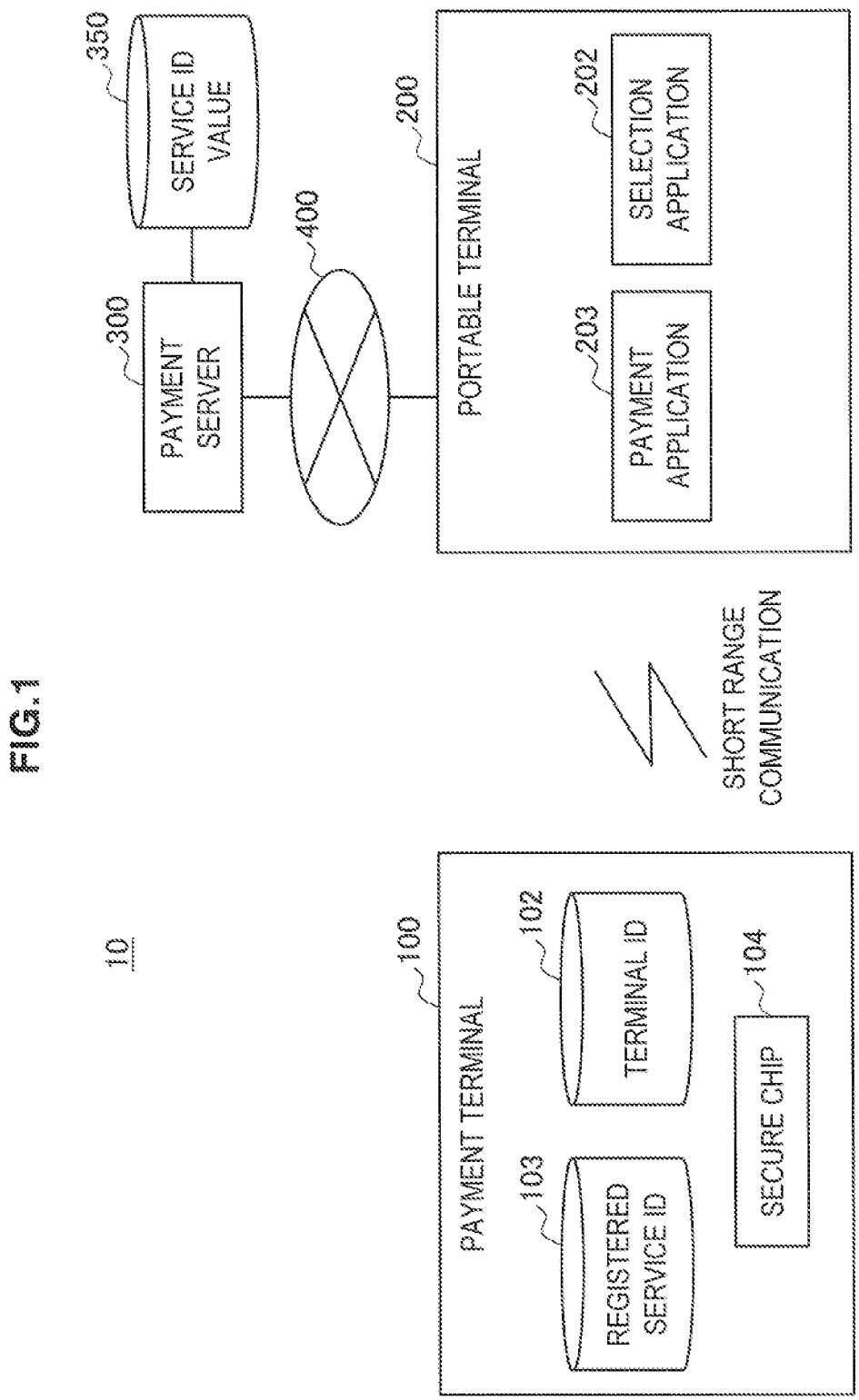
FIG. 1 is a diagram for describing an overview of a payment processing system according to the first embodiment of the present disclosure.

Note that description will be made in the next order.
1. First Embodiment
  1-1. Overview of Payment Processing System
  1-2. Exemplary Configuration of Payment Terminal
  1-3. Exemplary Configuration of Portable Terminal
  1-4. Exemplary Configuration of Payment Server
  1-5. Flow of Payment Processing by Payment Processing System
  1-6. Authentication Relationship in Payment Processing System
  1-7. Recapitulation
2. Second Embodiment
3. Third Embodiment
4. Exemplary Hardware Configuration 1. First Embodiment 1-1. Overview of Payment Processing System With reference to FIG. 1, description will be made of an overview of the payment processing system 10 according to the first embodiment of the present disclosure. FIG. 1 is a diagram for describing the overview of the payment processing system 10 according to the first embodiment of the present disclosure.

As shown in FIG. 1, the payment processing system 10 includes a payment terminal 100, a portable terminal 200 which is one example of a communication device, a payment server 300, and a network 400. For example, this payment processing system 10 executes payment processing by transmitting and receiving payment data between the payment terminal 100 of a store that provides a service and the payment server 300 of a business operator of an electronic money system via the portable terminal 200.

The payment terminal 100 is a terminal installed in a store that provides a service, and is a POS (Point Of Sales) device, for example. The payment terminal 100 stores a terminal ID 102 of the payment terminal 100, and a registered service ID 103 obtained from an electronic money business operator. The payment terminal 100 has a function of accepting a payment amount for payment processing, and a function of outputting a receipt after payment processing. Also, the payment terminal 100 includes a secure chip 104 that executes security processing.

Also, the payment terminal 100 includes a reader/writer (not shown in the drawings) for example, and executes short range communication (also referred to as contactless communication) with the portable terminal 200. For example, the payment terminal 100 executes communication with the portable terminal 200 by NFC (Near Field Communication) to transmit and receive data. The payment terminal 100 transmits encrypted payment data which is provided for the payment processing, via the portable terminal 200, to the payment server 300.

The portable terminal 200 is a terminal for use by a buyer to whom a service is provided, and is a smartphone or a cellular phone, for example. The portable terminal 200 transmits the payment data to and receives the payment data from the payment terminal 100, by the short range communication. Also, the portable terminal 200 transmits the payment data to and receives the payment data from the payment server 300 via the network 400 by wireless communication. In the portable terminal 200, a selection application 202 for selecting a service in payment processing, and a payment application 203 for each service are installed.

The payment server 300 is, for example, a server on the side of the business operator that administrates the electronic money system. The payment server 300 decodes the payment data received from the payment terminal 100 via the portable terminal 200, and executes the payment processing on the basis of the decoded payment data. The payment server 300 is connected to a database which is one example of a value storage unit for storing values 350 of service IDs to which a payment is executed, and executes payment processing with respect to a value associated with a service ID of the payment data.

The network 400 is a wireless or wired transmission channel that connects the portable terminal 200 with the payment server 300. The network 400 may include, for example, a public line network such as the Internet, a telephone line network, and a satellite communication network, as well as various types of LAN (Local Area Network), WAN (Wide Area Network) including Ethernet (registered trademark) and the like. Also, the network 400 may include a dedicated line network such as IP-VPN (Internet Protocol-Virtual Private Network). Note that the communication channel between the payment terminal 100 and the portable terminal 200, and the communication channel between the portable terminal 200 and the payment server 300 are encrypted in advance.

1-2. Exemplary Configuration of Payment Terminal

Figure 2:
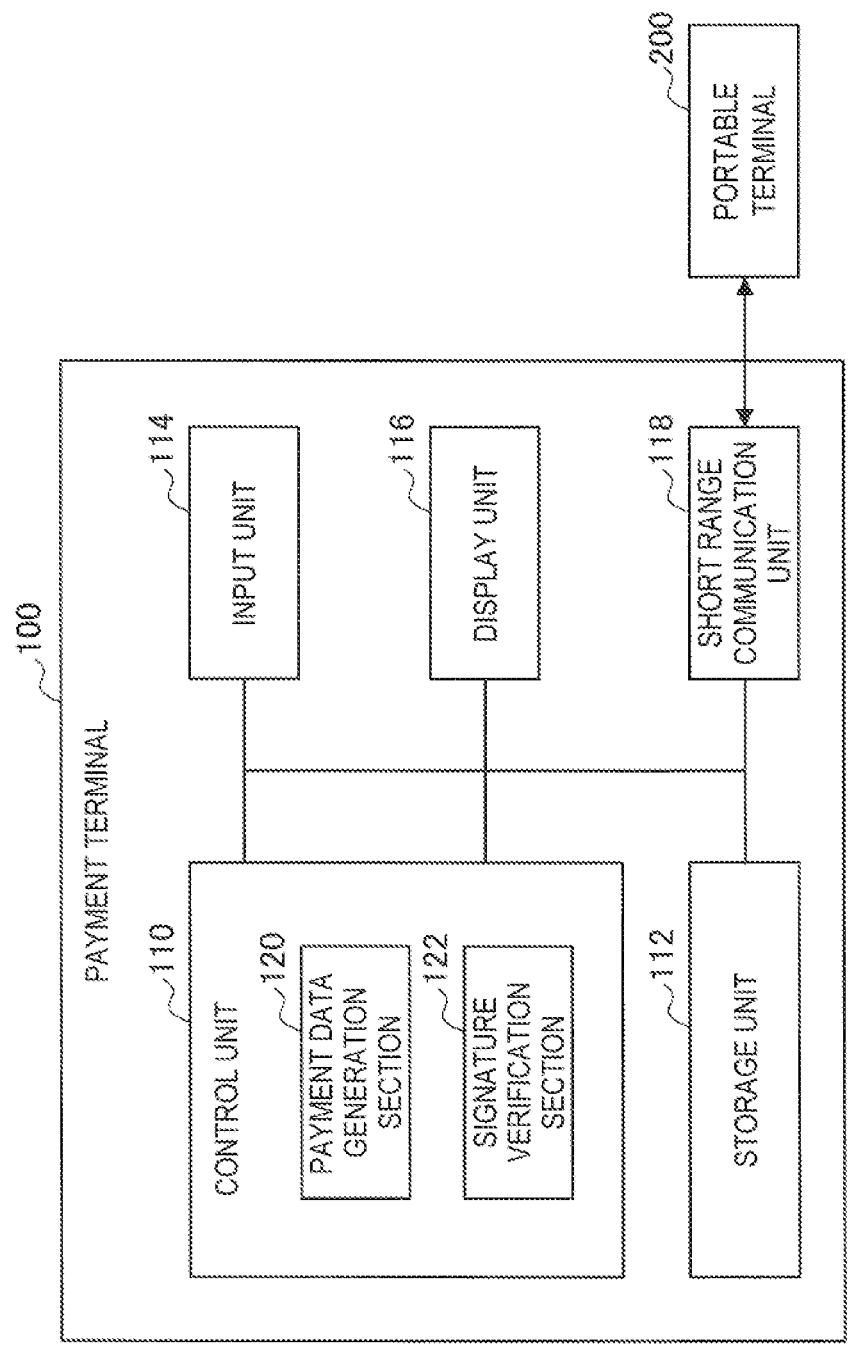
FIG. 2 is a block diagram illustrating one example of a functional configuration of a payment terminal according to the first embodiment.

With reference to FIG. 2, description will be made of one example of a functional configuration of the payment terminal 100 according to the first embodiment. FIG. 2 is a block diagram illustrating one example of the functional configuration of the payment terminal 100 according to the first embodiment.

The payment terminal 100 transmits the payment data to and receives the payment data from the payment server 300 via the portable terminal 200 in the payment processing system, and executes the payment processing. As shown in FIG. 2, the payment terminal 100 includes a control unit 110, a storage unit 112, an input unit 114, a display unit 116, and a short range communication unit 118 which is one example of a terminal communication unit.

The control unit 110 exchanges signals with each block of the payment terminal 100 and executes various types of calculations, in order to control general actions of the payment terminal 100. For example, the control unit 110 executes processing of generating and transmitting the payment data. The control unit 110 includes, for example, a CPU, a ROM, and a RAM. Also, the control unit 110 includes a payment data generation section 120, and a signature verification section 122.

The payment data generation section 120 generates the payment data illustrated in FIG. 3. The payment data includes payment information such as a payment amount and a terminal ID of the payment terminal 100. Note that the payment data is not directly transmitted to the payment server 300, but is transmitted to the portable terminal 200 by the short range communication unit 118.

FIG. 3 is a diagram illustrating one example of payment data Da generated by the payment data generation section 120 according to the first embodiment. The payment data Da includes a payment terminal ID, a server ID, a payment execution ID, a payment amount, a portable terminal ID, portable terminal server data, a signature value by the payment terminal, a service ID list, and additional information I1 which is one example of terminal additional information.

Figure 14:
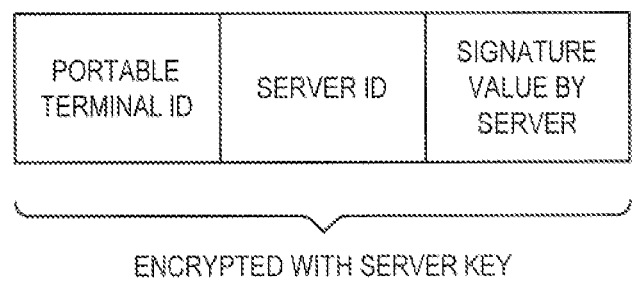
FIG. 14 is a diagram illustrating one example of portable terminal server data according to the first embodiment.

The terminal ID indicates an ID of the payment terminal 100. The server ID indicates an ID of the payment server 300. The payment execution ID is used as a number of the receipt output after payment. The payment amount is a payment amount accepted at the input unit 114. The portable terminal ID indicates an ID of the portable terminal 200. The portable terminal server data is used in the payment processing, and includes a portable terminal ID, a user ID, and a signature value by the server, as shown in FIG. 14. The user ID indicates an ID of the user of the portable terminal 200 used in the payment processing. FIG. 14 is a diagram illustrating one example of the portable terminal server data according to the first embodiment.

Returning to FIG. 3, the description of the payment data Da will be continued. The signature value by the payment terminal is used, by the payment server 300 that has received the payment data, for authentication of the payment terminal 100. The service ID list indicates a list of a plurality of service IDs for which the payment terminal 100 can execute processing (can execute a payment). The additional information I1 is information which is to be processed in the portable terminal 200. For example, the additional information I1 is information relevant to a special sale of the store in which the payment terminal 100 is installed (special sale schedule in next week, current special sale, and the like). Also, the additional information I1 may be added depending on the user of the portable terminal 200 that transmits the payment data.

The terminal ID and the payment amount in the payment data Da are given a signature by the payment terminal 100 (secure chip 104), and are encrypted in advance with a server key obtained from the server 300. On the other hand, the service ID list is not encrypted. Note that information of a payment amount identical with the encrypted payment amount is included in the payment data Da without encryption for the purpose of displaying it at the portable terminal 200 to the user. The payment amount provided for a payment at the payment server 300 is the encrypted payment amount.

The signature verification section 122 verifies authentication of the payment server 300, which is attached to the payment data after payment received from the portable terminal 200. Thereby, the payment terminal 100 can confirm whether the payment associated with the transmitted payment data is executed.

The storage unit 112 stores control programs that the control unit 110 executes, and data that the control unit 110 uses in the payment processing. For example, the storage unit 112 stores a terminal ID of the payment terminal 100, and a registered service ID obtained from the electronic money business operator. Also, the storage unit 112 stores information relevant to the additional information I1 of the payment data Da, and the server key obtained from the payment server 300.

The input unit 114 accepts user's manipulation to the payment terminal 100, and outputs input signals to the control unit 110. The input unit 114 accepts various types of information by the user's manipulation to the payment terminal 100. For example, the input unit 114 accepts the payment amount. The input unit 114 may be composed of a keyboard, a mouse, and the like, for example, but may be composed of a touch panel.

The display unit 116 displays various types of images and information on a display screen. The display unit 116 displays, for example, a setting screen relevant to the payment processing (for example, a screen for accepting the payment amount). The display unit 116 is, for example, a LCD and an OELD (Organic Electro-Luminescence Display) such as TFT (Thin Film Transistor).

The short range communication unit 118 includes a communication antenna, and executes the short range communication (NFC communication) with the portable terminal 200. The short range communication unit 118 transmits the payment data to and receives the payment data from the portable terminal 200 by the short range communication. For example, the short range communication unit 118 transmits the payment data generated by the payment data generation section 120 (payment data Da illustrated in FIG. 3) to the portable terminal 200.

The payment terminal 100 having the above configuration generates the payment data Da in which the payment amount information is encrypted, and transmits the generated payment data Da to the portable terminal 200 by the short range communication. Then, after the payment server 300 decodes the transmitted payment data and executes the payment processing, the payment terminal 100 receives the payment data including at least encrypted balance information from the portable terminal 200 by the short range communication. Thereby, without providing a network device in the payment terminal 100, the payment data is transmitted and received between the payment terminal 100 and the payment server 300 via the portable terminal 200. Also, since the encrypted payment data is transmitted and received, falsification of the encrypted information (for example, the terminal ID and the payment amount) is prevented in the portable terminal 200.

1-3. Exemplary Configuration of Portable Terminal

Figure 4:
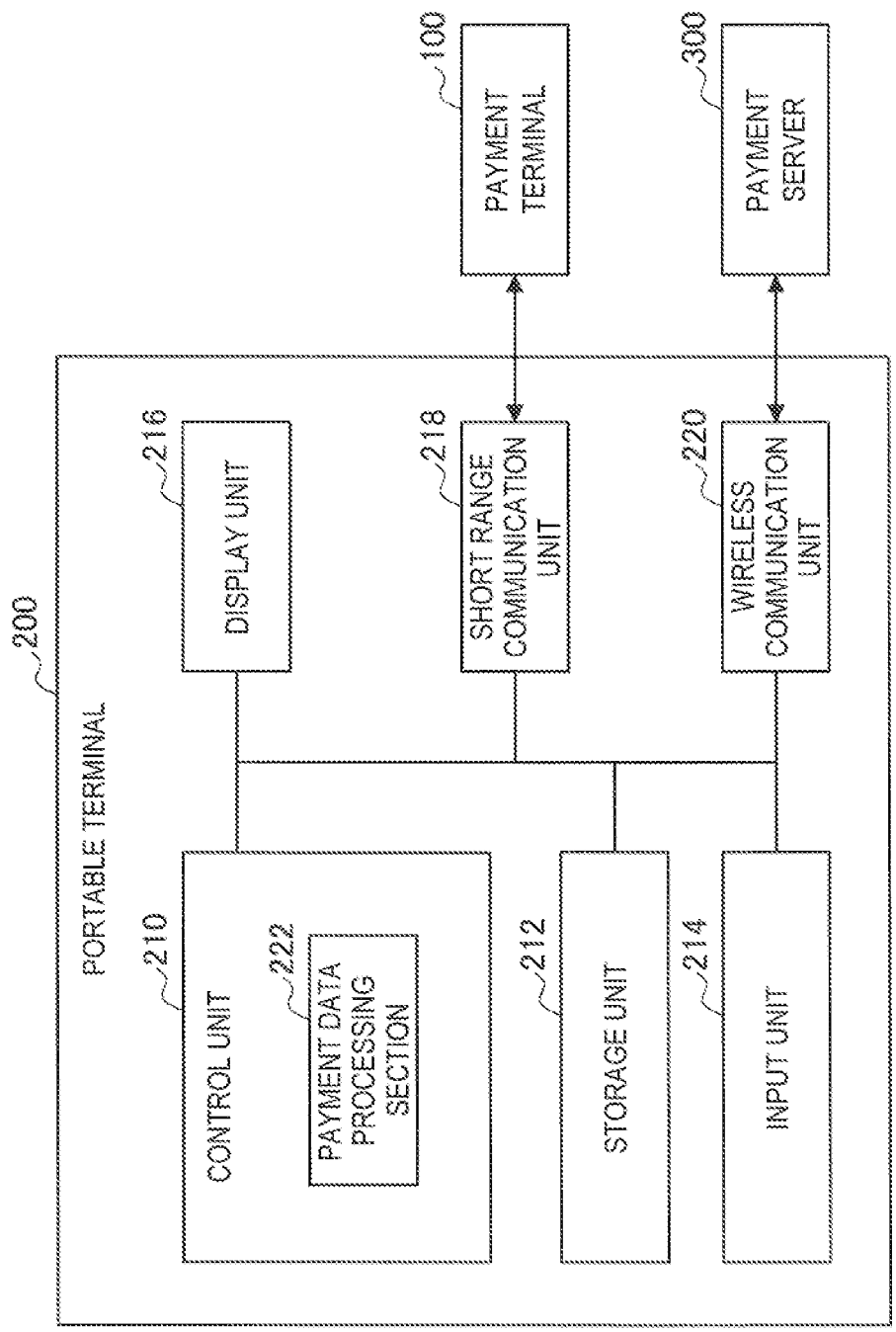
FIG. 4 is a block diagram illustrating one example of a functional configuration of a portable terminal according to the first embodiment.

With reference to FIG. 4, description will be made of one example of a functional configuration of the portable terminal 200 according to the first embodiment. FIG. 4 is a block diagram illustrating one example of the functional configuration of the portable terminal 200 according to the first embodiment.

The portable terminal 200 is a device to relay transmission and reception of the payment data between the payment terminal 100 and the payment server 300 in the payment processing system 10. As shown in FIG. 4, the portable terminal 200 includes a control unit 210, a storage unit 212, an input unit 214, a display unit 216, a short range communication unit 218 which is one example of a first device communication unit, and a wireless communication unit 220 which is one example of a second device communication unit.

The control unit 210 exchanges signals with each block of the portable terminal 200 and executes various types of calculations, in order to control the general actions of the portable terminal 200. For example, the control unit 210 executes processing of transmitting and receiving the payment data between the payment terminal 100 and the payment server 300. The control unit 210 includes a payment data processing section 222 which is one example of a device data processing section.

The payment data processing section 222 processes the payment data Da received from the payment terminal 100. The payment data processing section 222 executes processing associated with the additional information I1 included in the payment data Da. For example, the payment data processing section 222 executes processing for causing the display unit 216 to display on the basis of the additional information I1.

Also, the payment data processing section 222 generates the payment data Db which is to be transmitted to the payment server 300 illustrated in FIG. 5, using the payment data Da illustrated in FIG. 3. In other words, the payment data processing section 222 generates the payment data Db by adding other additional information (one example of device additional information) to the payment data Da.

FIG. 5 is a diagram illustrating one example of the payment data Db which is to be processed by the payment data processing section 222 according to the first embodiment. The payment data Db includes a payment terminal ID, a server ID, a payment execution ID, a payment amount, a portable terminal ID, portable terminal server data, and a signature value by the payment terminal, which are encrypted with the server key in the same manner as the payment data Da. Further, the payment data Db includes a service ID, and additional information I2.

The service ID is a service ID that the user of the portable terminal 200 has selected from among the service ID list of the payment data Da. In other words, the payment data processing section 222 replaces the service ID list with the service ID to which a payment is to be executed. The additional information I2 is information relevant to the user, and is, for example, a member ID of a payment service, an ID of a social utility site such as Facebook, and the like. The additional information I2 is not encrypted here. However, the additional information I2 may be encrypted too. Then, the payment server 300 executes processing associated with the additional information I2 of the payment data Db.

Note that, in the above, the payment data processing section 222 adds the additional information I2 to the payment data Db, but the additional information I2 may not be added. Also, when the payment data Da includes a service ID instead of the service ID list, the processing for replacing the service ID list with the service ID is not necessary.

Figure 7:
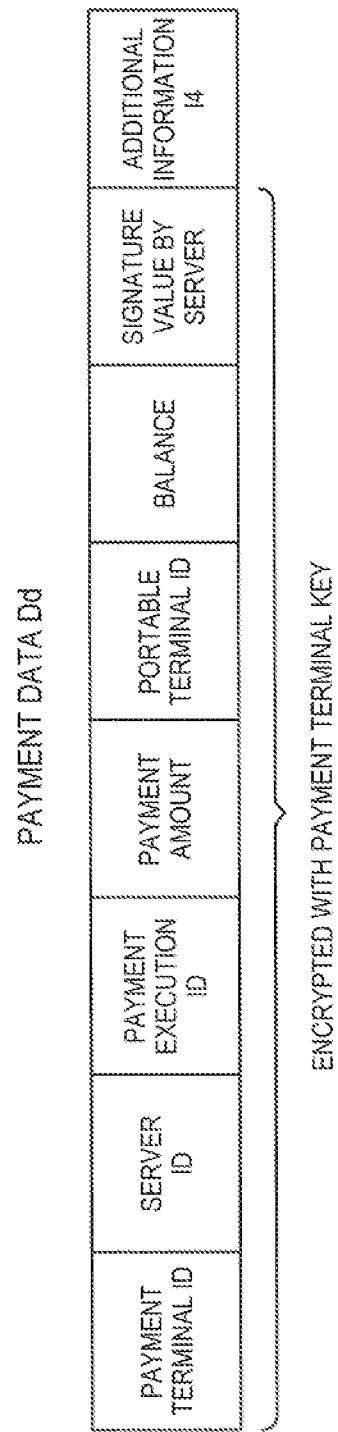
FIG. 7 is a diagram illustrating one example of payment data Dd which is to be processed by the payment data processing section according to the first embodiment.

Also, the payment data processing section 222 generates payment data Dd which is illustrated in FIG. 7 and which is to be transmitted to the payment terminal 100, by using the payment data Dc (data after the payment processing on the basis of the payment data Da in the payment server 300) which is illustrated in FIG. 6 and which is received from the payment server 300. In other words, the payment data processing section 222 generates the payment data Dd by adding other additional information (one example of device additional information) to the payment data Dc. Note that the additional information is not encrypted here. However, it is not limited to this, but the additional information may be encrypted too.

FIG. 6 is a diagram illustrating one example of payment data Dc received from a payment server 300 according to the first embodiment. The payment data Dc is generated in the payment server 300. The payment data Dc includes a payment terminal ID, a server ID, a payment execution ID, a payment amount, a portable terminal ID, a balance, and a signature value by the server, which are encrypted with a payment terminal key. Also, the payment data Dc includes additional information I3.

The payment terminal ID, the server ID, the payment execution ID, the payment amount, and the portable terminal ID of the payment data Dc are identical with the payment data Db illustrated in FIG. 5. The balance is an amount of money available for the user of the portable terminal 200. The additional information I3 is information which is to be processed in the portable terminal, and is, for example, advertisement information, sightseeing information, point information, and the like around the payment terminal 100, which are reflecting registered information of the payment terminal 100 (position information of the payment terminal 100). Then, the portable terminal 200 (the payment data processing section 222) executes processing associated with the additional information I3 of the payment data Dc. Note that the terminal ID, the payment amount, the service ID, the server ID, and the balance of the payment data Dc are given a signature by the payment server 300, and are encrypted with the terminal key of the payment terminal 100. On the other hand, the additional information I3 is not encrypted here. However, the additional information I3 may be encrypted too.

Figure 15:
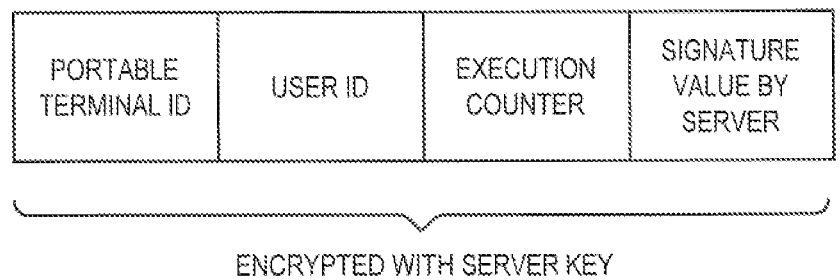
FIG. 15 is a diagram illustrating one example of portable terminal server data according to a variant example of the first embodiment.

The payment data processing section 222 may add the portable terminal server data of the payment data Db to the additional information I3. Then, the portable terminal server data added to the payment data I3 may be used in the subsequent processing. Note that, in such a case, an execution counter is added to the portable terminal server data, as shown in FIG. 15. Thereby, a security concern that a telegram from the payment terminal 100 is reusable is solved. FIG. 15 is a diagram illustrating one example of the portable terminal server data according to a variant example of the first embodiment.

FIG. 7 is a diagram illustrating one example of the payment data Dd which is processed by the payment data processing section 222 according to the first embodiment. The payment data Dd includes a payment terminal ID, a server ID, a payment execution ID, a payment amount, a portable terminal ID, a balance, and a signature value by the server, which are encrypted with the payment terminal key in the same manner as the payment data Dc. Further, the payment data Dd includes additional information I4.

The payment terminal ID, the server ID, the payment execution ID, the payment amount, the portable terminal ID, the balance, and the signature value by the server of the payment data Dd are identical with the payment data Dc. The additional information I4 is not encrypted here, and is information which is to be processed in the payment terminal 100. However, the additional information I4 may be encrypted too. For example, the additional information I4 is occurrence or non-occurrence of acceptance of a receipt from the payment terminal 100, information relevant to a choice of a service to which points of a point service is given, and the like. Then, the payment terminal 100 executes processing associated with the additional information I4 of the payment data Dd.

The storage unit 212 stores control programs that the control unit 210 executes, and various types of data that the control unit 210 processes. For example, the storage unit 212 stores information relevant to the additional information I2 of the payment data Db, and information relevant to the additional information I4 of the payment data Dd. Also, the storage unit 212 stores information relevant to the service ID that the portable terminal 200 can respond to. The storage unit 212 is composed of a flash memory and the like, for example.

The input unit 214 accepts manipulation of the user of the portable terminal 200, and outputs an input signal to the control unit 210. The input unit 214 accepts various types of information by the manipulation of the user of the portable terminal 200. The input unit 214 can be composed of keys, buttons, switches, and the like, for example, but may be composed of a touch panel.

The display unit 216 displays various types of images and information on a display screen. The display unit 216 displays, for example, information associated with the additional information I1 included in the payment data Da received from the payment terminal 100 (here, information relevant to a special sale of the store in which the payment terminal 100 is installed). Thereby, the user of the portable terminal 200 can obtain information relevant to the store, by watching the display of the display unit 216. Also, the user can also know the individual information added to the additional information I1, and can protect the privacy of the user.

The short range communication unit 218 executes the short range communication (NFC communication) with the short range communication unit 118 of the payment terminal 100. The short range communication unit 218 transmits the payment data to and receive the payment data from the portable terminal 200 by the short range communication. The short range communication unit 218 receives the payment data Da from the payment terminal 100. Also, the short range communication unit 218 transmits the payment data after payment Dd (refer to FIG. 6) generated by the payment data processing section 222, to the payment terminal 100.

The wireless communication unit 220 executes the wireless communication with the payment server 300 via the network 400. The wireless communication unit 220 transmits the payment data Db (FIG. 5) generated by the payment data processing section 222 to the payment server 300, and receives the payment data Dc after payment, which is illustrated in FIG. 6, from the payment server 300. The wireless communication unit 220 includes, for example, a network interface card, a modem and others, and executes communication processing with the payment server 300 via the network such as the Internet and a LAN (Local Area Network). The wireless communication unit 220 may include a wireless LAN module or a WWAN (Wireless Wide Area Network) module.

The portable terminal 200 having the above configuration receives the payment data Da generated in the payment terminal 100 from the payment terminal 100 by the short range communication, and transmits the payment data Db based on the received payment data Da via the network 400 to the payment server 300. Also, after the payment server 300 decodes the transmitted payment data Da and executes the payment processing, the portable terminal 200 receives the payment data Dc including at least the encrypted balance information via the network 400 from the payment server 300. Then, the portable terminal 200 transmits the payment data Dd based on the received payment data Dc to the payment terminal 100 by the short range communication. Thereby, without providing a network device in the payment terminal 100, the payment data is transmitted and received between the payment terminal 100 and the payment server 300 via the portable terminal 200. Also, since the encrypted payment data is transmitted and received, falsification of the encrypted information (for example, the terminal ID and the payment amount) is prevented in the portable terminal 200.

1-4. Exemplary Configuration of Payment Server

Figure 8:
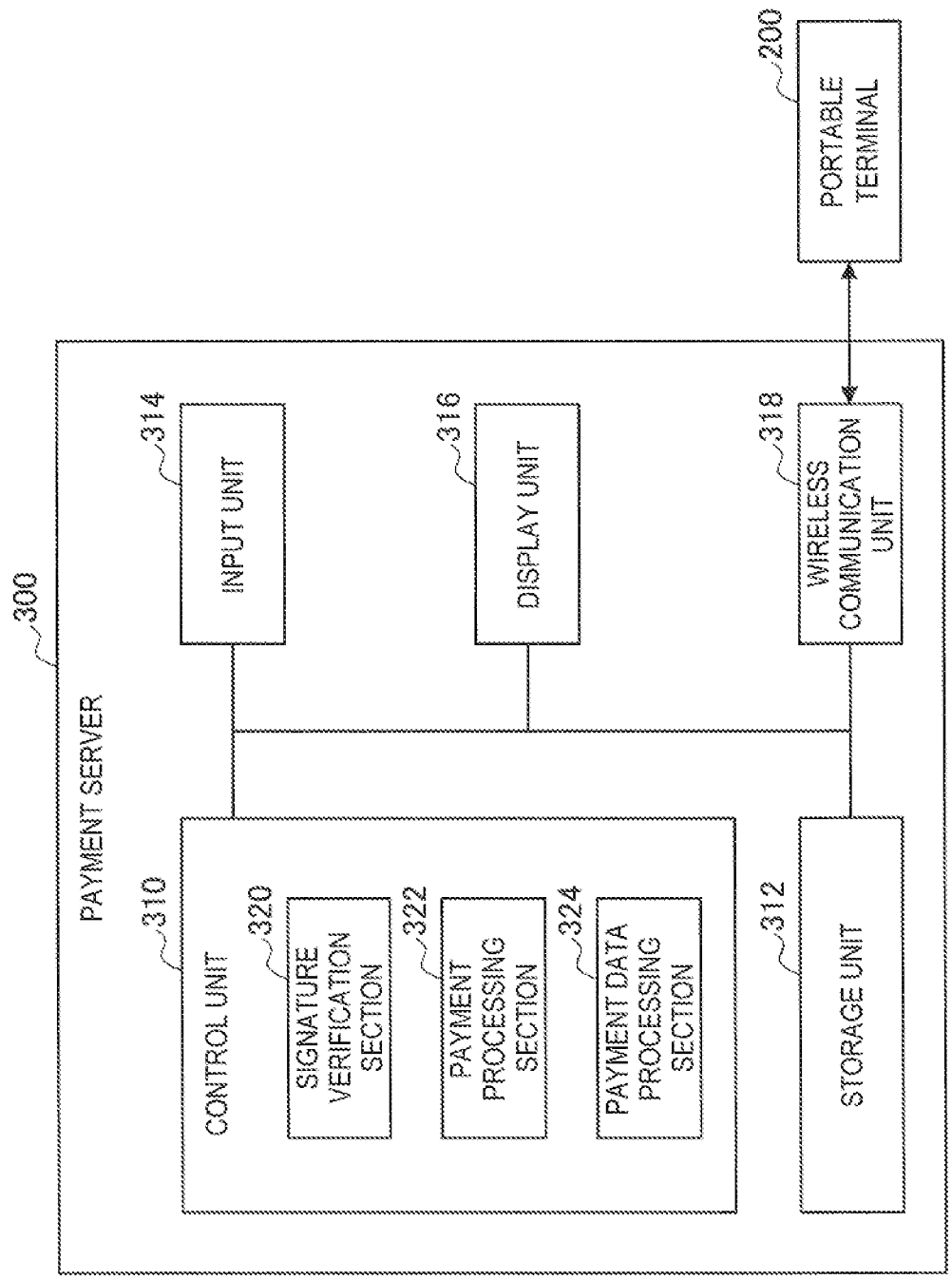
FIG. 8 is a block diagram illustrating one example of a functional configuration of the payment server according to the first embodiment.

With reference to FIG. 8, the description will be made of one example of the functional configuration of the payment server 300 according to the first embodiment. FIG. 8 is a block diagram illustrating one example of the functional configuration of the payment server 300 according to the first embodiment.

The payment server 300 decodes the payment data received from the payment terminal 100 via the portable terminal 200, and executes the payment processing. Also, the payment server 300 transmits the payment data after payment via the portable terminal 200 to the payment terminal 100. As shown in FIG. 8, the payment server 300 includes a control unit 310, a storage unit 312, an input unit 314, a display unit 316, and a wireless communication unit 318 which is one example of a server communication unit.

The control unit 310 exchanges signals with each block of the payment server 300 and executes various types of calculations, in order to control the general actions of the payment server 300. For example, the control unit 310 executes the payment processing on the basis of the received payment data. The control unit 310 includes a signature verification section 320, a payment processing section 322, and a payment data processing section 324.

The signature verification section 320 verifies authentication of the payment terminal 100 by the terminal ID of the payment data Db received from the portable terminal 200. Specifically, the signature verification section 320 decodes the encrypted data in the payment data Db with the server key, and verifies the signature value by the payment terminal 100 to confirm the payment terminal ID. Thereby, the payment server 300 confirms that the payment terminal 100 is a device registered for the service.

The payment processing section 322 executes the payment processing, using the decoded payment data Db. In other words, the payment processing section 322 executes payment of the payment amount of the payment data Db (the payment amount that has been encrypted) with regard to the value associated with the service ID of the payment data Db (in other words, the value 350 stored in the database connected to the payment server 300 illustrated in FIG. 1). Thereby, the value need not be registered in the portable terminal 200, so that the payment processing can be executed for various values.

The payment data processing section 324 processes the payment data Db received from the portable terminal 200. The payment data processing section 324 executes processing associated with the additional information I2 (member ID of the payment service and others) included in the payment data Db. For example, the payment data processing section 324 can comprehensively manage the payment processing and the member ID with reference to the additional information I2. Also, the payment data processing section 324 may executes processing of acquiring service points and the like with reference to the member ID.

Also, the payment data processing section 324 generates the aforementioned payment data Dc illustrated in FIG. 6 on the basis of the payment data Db, after the payment processing by the payment processing section 322. In other words, the payment data processing section 324 generates the payment data Dc including the terminal ID, the payment amount, the service ID, the server ID, the balance, and the additional information I3. The terminal ID, the payment amount, the service ID, the server ID, and the balance of the payment data Dc are given a signature by the payment server 300, and are encrypted with the terminal key of the payment terminal 100 obtained in advance from the payment terminal 100. On the other hand, the additional information I3 is not encrypted.

The storage unit 312 stores control programs that the control unit 310 executes, and various types of data that the control unit 310 processes. For example, the storage unit 312 stores the server ID of the payment server 300 of the payment data Dc. Also, the storage unit 312 stores information relevant to the additional information I3 of the payment data Dc.

The input unit 314 accepts manipulation of the operator of the payment server 300, and outputs an input signal to the control unit 310. The input unit 314 may be composed of a keyboard, a mouse, and the like, for example, but may be composed of a touch panel.

The display unit 316 displays various types of images and information on a display screen. The display unit 316 displays, for example, information relevant to the payment data Db received from the portable terminal 200.

The wireless communication unit 318 executes the wireless communication with the portable terminal 200 via the network 400, to transmit and receive the payment data. Specifically, the wireless communication unit 318 receives the payment data Db illustrated in FIG. 5 from the portable terminal 200, and transmits the payment data Dc illustrated in FIG. 6 to the portable terminal 200 after the payment processing.

The payment server 300 having the above configuration receives the payment data Db based on the payment data Da generated in the payment terminal 100, via the network 400 from the portable terminal 200, decodes the received payment data Db, and executes the payment processing. Also, the payment server 300 transmits the payment data Dd including at least the balance information encrypted after payment, via the network 400 to the portable terminal 200. Thereby, without providing a network device in the payment terminal 100, the payment data is transmitted and received between the payment terminal 100 and the payment server 300 via the portable terminal 200. Also, since the encrypted payment data is transmitted and received, falsification of the encrypted information (for example, the terminal ID and the payment amount) is prevented in the portable terminal 200.

1-5. Flow of Payment Processing by Payment Processing System

Figure 9:
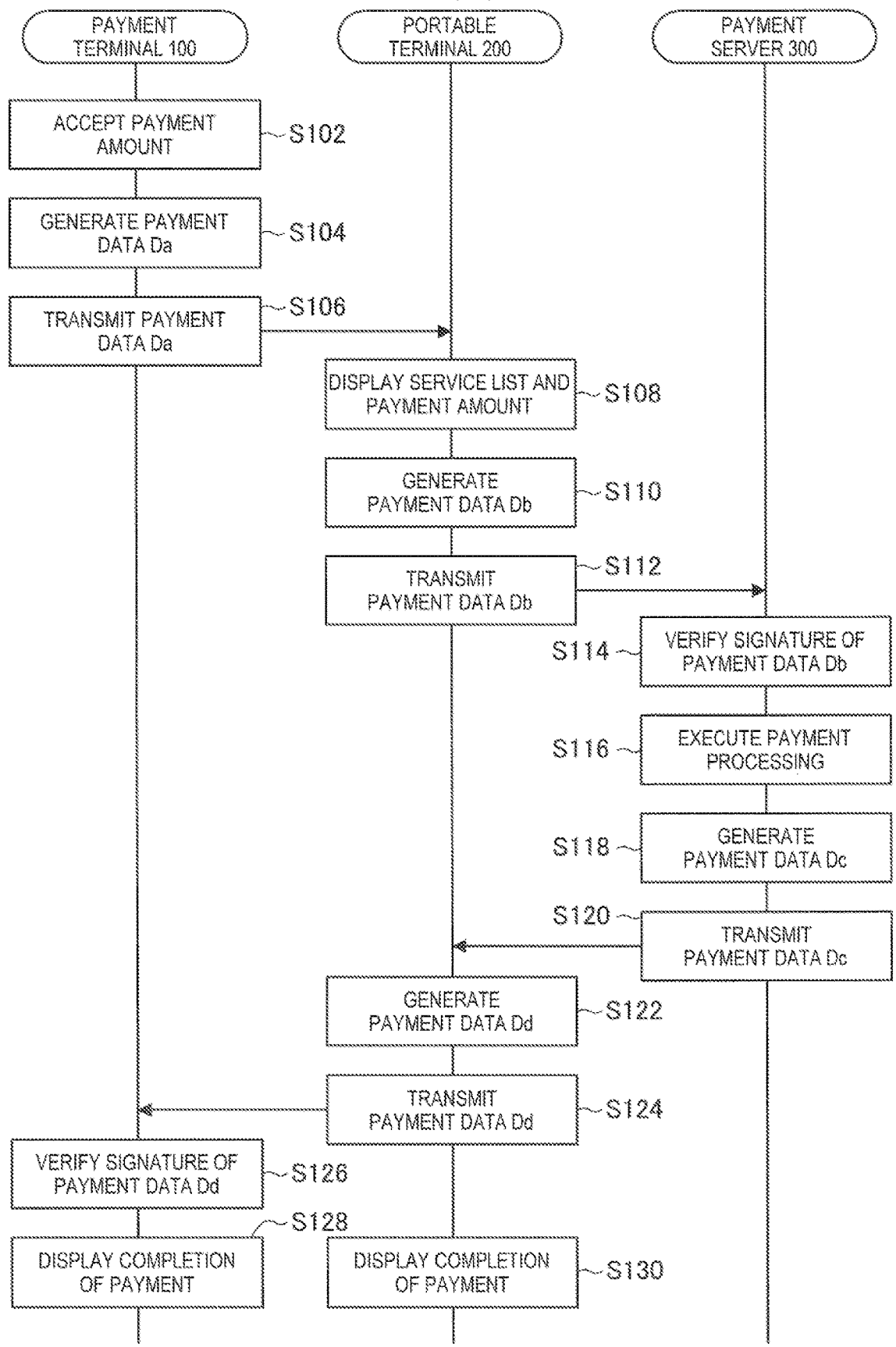
FIG. 9 is a flowchart illustrating a flow of payment processing by the payment processing system according to the first embodiment.

With reference to FIG. 9, description will be made of the flow of the payment processing by the payment processing system according to the first embodiment 10. FIG. 9 is a flowchart illustrating the flow of payment processing by the payment processing system 10 according to the first embodiment.

The present payment processing is realized by executing a program stored in the storage units 112, 212, 312 by the control units 110, 210, 310 of the payment terminal 100, the portable terminal 200, and the payment server 300.

A flowchart illustrated in FIG. 9 starts from a point where the input unit 114 of the payment terminal 100 accepts the payment amount input by a store clerk of the store, for example (step S102). Thereafter, the payment data generation section 120 of the payment terminal 100 generates the payment data Da illustrated in FIG. 3 (step S104).

Here, the payment data Da includes the terminal ID of the payment terminal 100, the payment amount accepted by the input unit 114, the service ID list processable by the payment terminal 100, and the additional information I1, as shown in FIG. 3. Note that the payment amount of the payment data Da and data of the terminal ID are given a signature by the payment terminal 100, and are encrypted with the server key stored in the storage unit 112.

Thereafter, when the user holds the portable terminal 200 over the payment terminal 100, the short range communication unit 118 transmits the payment data Da generated by the payment data generation section 120 to the portable terminal 200 (step S106).

The short range communication unit 218 of the portable terminal 200 receives the payment data Da transmitted from the payment terminal 100. Thereafter, the display unit 216 displays the service list and the payment amount on the basis of the received payment data Da (step S108). Note that the displayed service list is a list of the service IDs that are registered in advance in the portable terminal 200 among the service IDs in the payment data Da. The user of the portable terminal 200 can select a desired service from among the displayed service list. Also, the portable terminal 200 may execute processing associated with the additional information I1 of the payment data Da.

Thereafter, the payment data processing section 222 generates the payment data Db which is illustrated in FIG. 5 and which is associated with the service selected by the user in the selection screen, (step S110). The payment data processing section 222 replaces the service ID list of the payment data Da with the service ID selected by the user, and adds the additional information I2 to generate the payment data Db.

Thereafter, the wireless communication unit 220 transmits the payment data Db generated by the payment data processing section 222, to the payment server 300 via the network 400 (step S112). In this way, in the present payment processing, the payment data generated by the payment terminal 100 is transmitted via the portable terminal 200 to the payment server 300.

The wireless communication unit 318 of the payment server 300 receives the payment data Db transmitted from the portable terminal 200. Thereafter, the signature verification section 320 verifies the signature of the payment terminal 100 attached to the received payment data Db (step S114). Thereby, the payment server 300 confirms that the payment terminal 100 is a device registered for the service.

Thereafter, the payment processing section 322 executes the payment processing with respect to the value associated with the service ID selected by the user (service ID of the payment data Db) (step S116). In other words, the payment processing section 316 executes the payment processing with respect to the value which is contained in the database and associated with the service ID. At this, the payment processing section 322 is capable of payment by the database for each user, using the portable terminal server data (refer to FIG. 14) in the payment data Db. Also, the payment server 300 may execute processing associated with the additional information I2 of the payment data Db.

Thereafter, the payment data processing section 324 generates the payment data Dc illustrated in FIG. 6 on the basis of the payment data Db (step S118). The payment data Dc includes the device ID of the payment terminal 100, the payment amount, the service ID, the server ID of the server 300, the balance, and the additional information I3. In other words, the payment data processing section 324 generates the payment data Dc by adding the server ID of the payment server 300, the balance, and the additional information I3, to the payment data Db. Note that the device ID, the payment amount, the service ID, the server ID, and the balance of the payment data Dc are given a signature by the payment server 300, and are encrypted with the terminal key of the payment terminal 100 which is stored in the storage unit 312.

Thereafter, the wireless communication unit 318 transmits the payment data Dc generated by the payment data processing section 324, to the portable terminal 200 (step S120). In this way, in the present payment processing, the payment data Dc generated by the payment server 300 is not directly transmitted to the payment terminal 100, but is transmitted via the portable terminal 200.

The portable terminal 200 receives the payment data Dc transmitted from the payment server 300, by the wireless communication unit 220. The portable terminal 200 may execute processing associated with the additional information I3 of the payment data Dc. Thereafter, the payment data processing section 222 generates the payment data Dd illustrated in FIG. 7 on the basis of the received payment data Dc (step S122). The payment data processing section 222 generates the payment data Dd by adding the additional information I4 to the payment data Dc.

Thereafter, the short range communication unit 218 transmits the payment data Dd generated by the payment data processing section 216, to the payment terminal 100 (step S124).

The short range communication unit 118 of the payment terminal 100 receives the payment data Dd transmitted from the portable terminal 200. Thereafter, the signature verification section 122 verifies the signature of the server 300 attached to the received payment data Dd (step S126). Thereby, the payment terminal 100 confirms that the payment processing has been executed.

Thereafter, the display unit 116 displays information indicating completion of the payment (step S128). At this, the payment terminal 100 may output a receipt relevant to the payment. Also, the payment terminal 100 may execute processing associated with the additional information I4 of the payment data Dd.

Note that the display unit 216 of the portable terminal 200 also displays information indicating completion of the payment (step S130). Thereby, the user of the portable terminal 200 can also grasp the completion of the payment. By the above, the payment processing by the payment processing system 10 is completed.

1-6. Authentication Relationship in Payment Processing System

Figure 10:
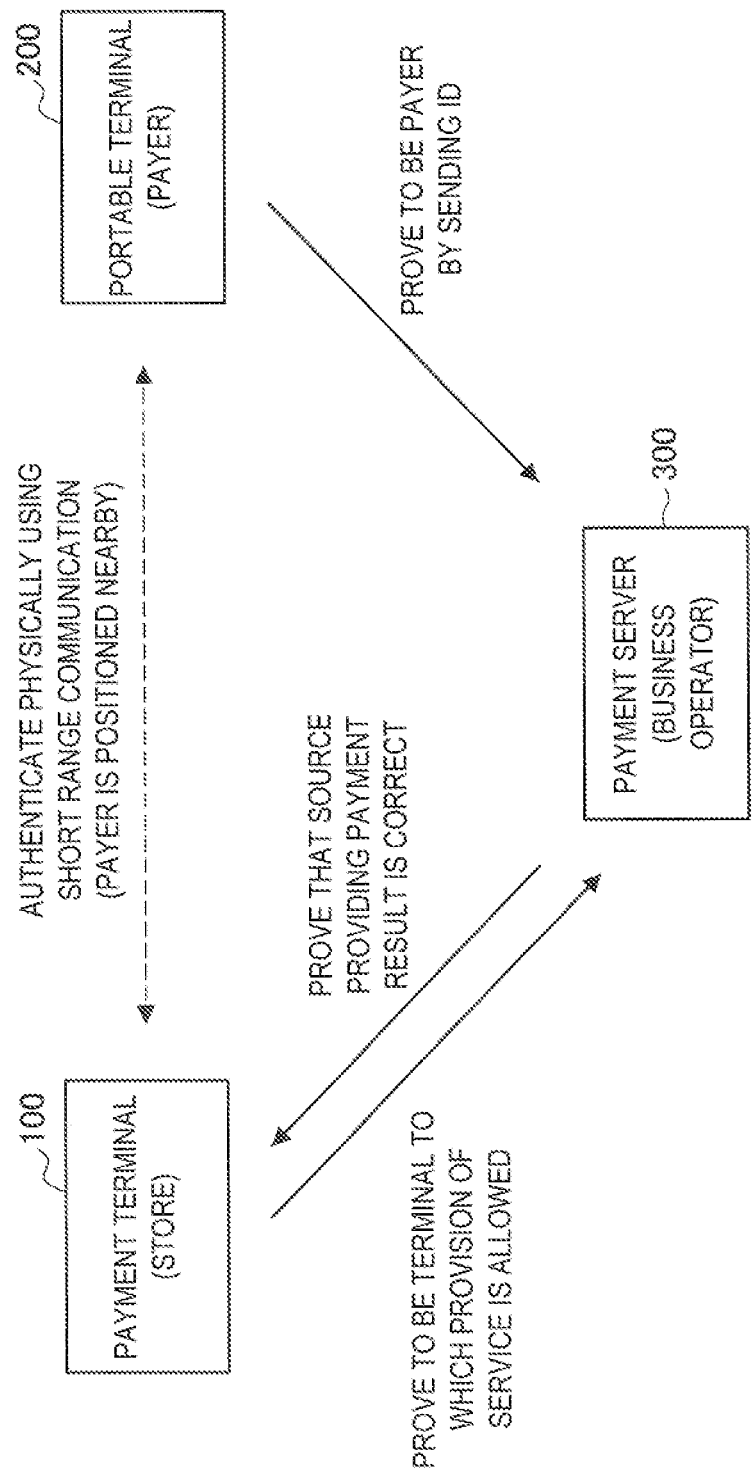
FIG. 10 is a schematic diagram for describing authentication relationship in the payment processing system according to the first embodiment.

With reference to FIG. 10, description will be made of the authentication relationship in the payment processing system 10 according to the first embodiment. FIG. 10 is a schematic diagram for describing the authentication relationship in the payment processing system 10 according to the first embodiment.

As described above, the payment terminal 100 and the portable terminal 200 execute the short range communication, and therefore the portable terminal 200 is positioned adjacent to the payment terminal 100. Since the portable terminal 200 is positioned adjacent to the payment terminal 100 in this manner, the service provider side of the payment terminal 100 can physically authenticate the portable terminal 200.

Also, since the portable terminal 200 transmits the information such as an ID of the portable terminal 200 and the like to the payment server 300, the payment server 300 can authenticate on the basis of ID information and the like. Note that information such as the ID of the portable terminal 200 is transmitted to the payment server 300 through the communication channel for which another security is ensured. Thereby, the business operator side of the payment server 300 can confirm whether or not the user of the portable terminal 200 is a payer.

Regarding the authentication relationship between the payment terminal 100 and the payment server 300, the payment terminal 100 first transmits the payment data including the terminal ID via the portable terminal 200 to the payment server 300, so that the payment server 300 can confirm, by checking and comparing the terminal ID, whether or not to be a terminal to which the provision of the service is allowed. On the other hand, the payment server 300 transmits the payment data including the server ID via the portable terminal 200 after payment, so that the payment terminal 100 can confirm whether or not the source providing the payment result is correct.

In this way, according to the payment processing system 10, since the payment data is transmitted and received via the portable terminal 200 between the payment terminal 100 and the payment server 300, mutual authentication is achieved to realize a secure payment method.

1-7. Recapitulation

As described above, in the payment processing system 10 according to the first embodiment, the payment terminal 100 generates the payment data Da in which the payment amount information is encrypted, and transmits the generated payment data Da to the portable terminal 200 by the short range communication. Thereafter, the portable terminal 200 transmits, via the network 400 to the payment server 300, the payment data Db based on the payment data Da received from the payment terminal 100 by the short range communication. Thereafter, the payment server 300 decodes the payment data Db received from the portable terminal 200 via the network 400, executes the payment processing, and transmits the payment data Dc including at least the balance information encrypted after payment, via the network 400 to the portable terminal 200. Then, the portable terminal 200 transmits the payment data Dd based on the payment data Dc received from the payment server 300, to the payment terminal 100 by the short range communication.

Thereby, without providing a network device in the payment terminal 100, the payment data is transmitted and received between the payment terminal 100 and the payment server 300 via the portable terminal 200. Also, since the encrypted payment data is transmitted and received, falsification of the encrypted information (for example, the terminal ID and the payment amount) is prevented in the portable terminal 200. Accordingly, a secure and versatile payment method is realized, using the payment terminal 100 not having a dedicated network device for communication with the payment server. Further, the below secondary effects are achieved.

First, the number of components is reduced by not providing a network device in the payment terminal 100, and thereby the cost reduction of the payment terminal 100 is achieved. Also, increase of program codes due to provision of the network device is prevented, and thereby the expenditure for developing software is suppressed.

Also, functions of the payment terminal 100 are simplified, and thereby setting operation for introducing a new service is reduced. Also, alteration of internal settings becomes unnecessary, which enables long-term use of the payment terminal 100 and reduces the maintenance cost. Also, since the memory amount of the payment terminal 100 is not a limitation, the payment terminal 100 can easily accommodate a rich and complicated service which may be introduced in future.

Also, when the buyer makes a payment at the payment terminal 100, the credibility to the store where the payment terminal 100 is installed is one alarming factor. For example, when making a payment at a store like a street stand which opens only for several days, a buyer has a psychological difficulty in passing a credit card. In contrast, in the first embodiment, since the connection to the payment server 300 is made by the portable terminal 200, the payment processing is realized within a credible system.

2. Second Embodiment

Figure 11:
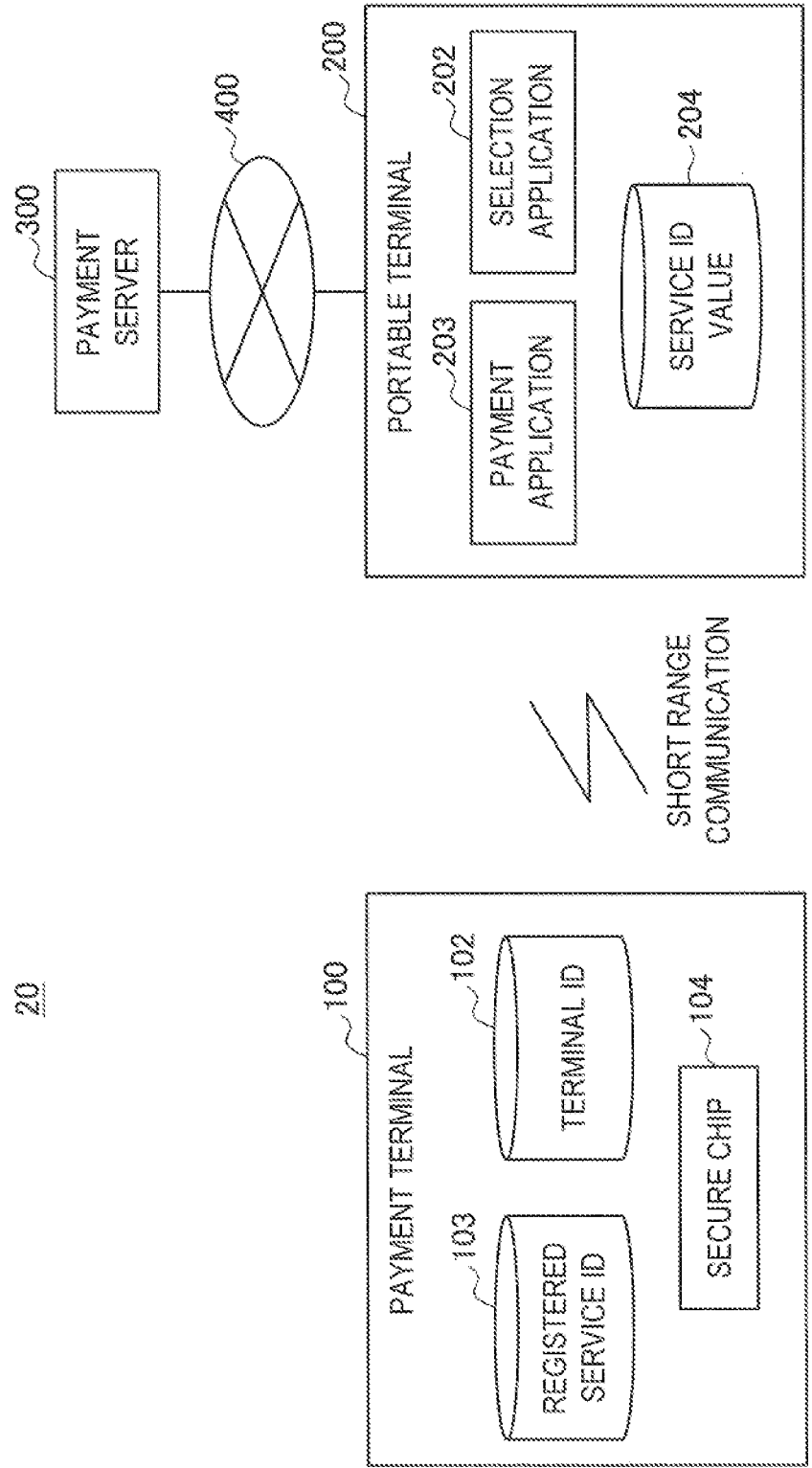
FIG. 11 is a diagram for describing an overview of a payment processing system according to the second embodiment of the present disclosure.

With reference to FIG. 11, description will be made of an overview of the payment processing system 20 according to the second embodiment of the present disclosure. FIG. 11 is a diagram for describing the overview of the payment processing system 20 according to the second embodiment of the present disclosure.

The payment processing system 20 according to the second embodiment executes the payment processing in a similar manner to the aforementioned payment processing system according to the first embodiment 10. As shown in FIG. 11, the payment processing system 20 includes a payment terminal 100, a portable terminal 200, a payment server 300, and a network 400. In the following, description will be omitted with regard to configurations similar to the first embodiment.

While in the first embodiment the service ID value 350 (FIG. 1) is connected to the database connected to the payment server 300, in the second embodiment the portable terminal 200 includes the service ID values 204. In other words, the portable terminal 200 includes a value storage unit that stores the values of the payable services. Thus, the payment server 300 executes the payment processing with respect to the service ID value 204 which is contained in the portable terminal 200 and which is associated with the service ID of the payment data received from the payment terminal 100 via the portable terminal 200. Thus, the payment processing is executed only to the value registered in the portable terminal 200 in advance, so that the payment processing is prevented from being executed to an unexpected value.

In the payment processing system 20 according to the second embodiment as well, the payment data is transmitted and received via the portable terminal 200 between the payment terminal 100 and the payment server 300. Thus, without providing a network device in the payment terminal 100, the payment data is transmitted and received between the payment terminal 100 and the payment server 300 via the portable terminal 200. Also, since the encrypted payment data is transmitted and received, the encrypted information is prevented from falsification. Accordingly, a secure and versatile payment method is realized, using the payment terminal 100 not having a dedicated network device for communication with the payment server.

3. Third Embodiment

Figure 12:
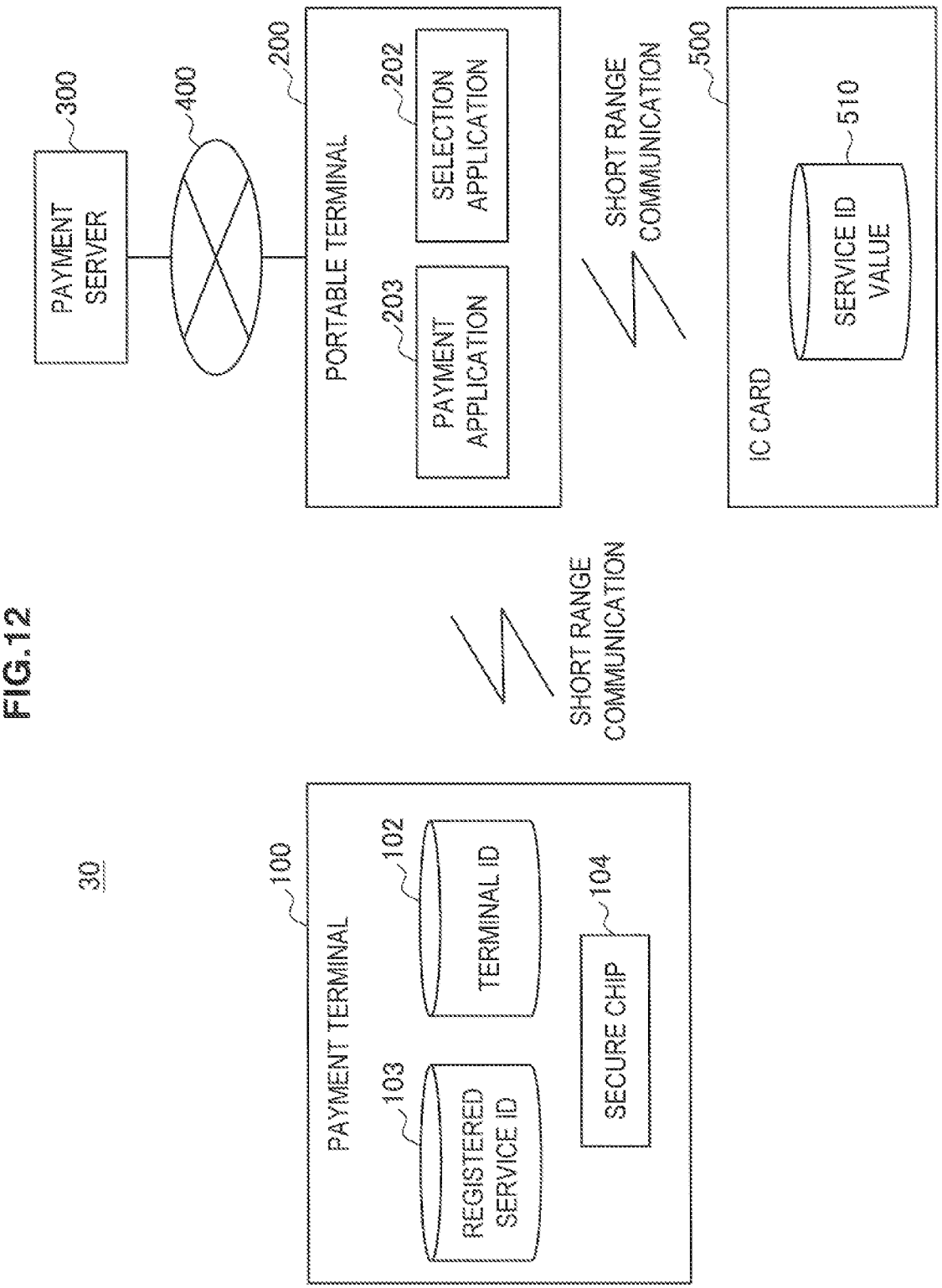
FIG. 12 is a diagram for describing an overview of a payment processing system according to the third embodiment of the present disclosure.

With reference to FIG. 12, description will be made of an overview of the payment processing system 30 according to the third embodiment of the present disclosure. FIG. 11 is a diagram for describing the overview of the payment processing system 30 according to the third embodiment of the present disclosure.

The payment processing system 30 according to the third embodiment executes the payment processing in a similar manner to the aforementioned payment processing system 10 according to the first embodiment. As shown in FIG. 12, the payment processing system 30 includes a payment terminal 100, a portable terminal 200, a payment server 300, a network 400, and an IC card 500. In the following, description will be omitted with regard to configurations similar to the first embodiment.

While in the first embodiment the service ID value 350 (FIG. 1) is connected to the database connected to the payment server 300, in the third embodiment the IC card 500 includes the service ID values 510. In other words, the IC card 500 includes a value storage unit that stores the values of the payable services. Thus, the payment server 300 executes the payment processing with respect to the service ID value 510 which is contained in the IC card 500 and which is associated with the service ID of the payment data received from the payment terminal 100 via the portable terminal 200. Thus, the payment processing with respect to various values is achieved by the user who causes the IC card 500 storing an intended value to communicate with the portable terminal 200

The IC card 500 executes short range communication (contactless communication) with the portable terminal 200. Thus, the portable terminal 200 has a reader/writer function. Note that, in the above, the IC card 500 executes the contactless communication with the portable terminal 200, but is not limited thereto. For example, the IC card 500 may execute contact communication with the portable terminal 200. Also, although the IC card 500 is taken as an example for description, the device is not limited thereto and may take any form, provided that the device is a communication device having a function to contain the service ID values.

In the payment processing system 20 according to the third embodiment as well, the payment data is transmitted and received via the portable terminal 200 between the payment terminal 100 and the payment server 300. Thus, without providing a network device in the payment terminal 100, the payment data is transmitted and received between the payment terminal 100 and the payment server 300 via the portable terminal 200. Also, since the encrypted payment data is transmitted and received, the encrypted information is prevented from falsification. Accordingly, a secure and versatile payment method is realized using the payment terminal 100 not having a dedicated network device for communication with the payment server.

4. Exemplary Hardware Configuration

The payment processings by the payment processing systems 10, 20, 30 according to the aforementioned first to third embodiments are realized by cooperation of software and a hardware configuration including the payment terminal 100, the portable terminal 200, and the payment server 300. Since the payment terminal 100, the portable terminal 200, and the payment server 300 have similar hardware configurations, one example of the hardware configuration of the portable terminal 200 will be described with reference to FIG. 13 in the following.

Figure 13:
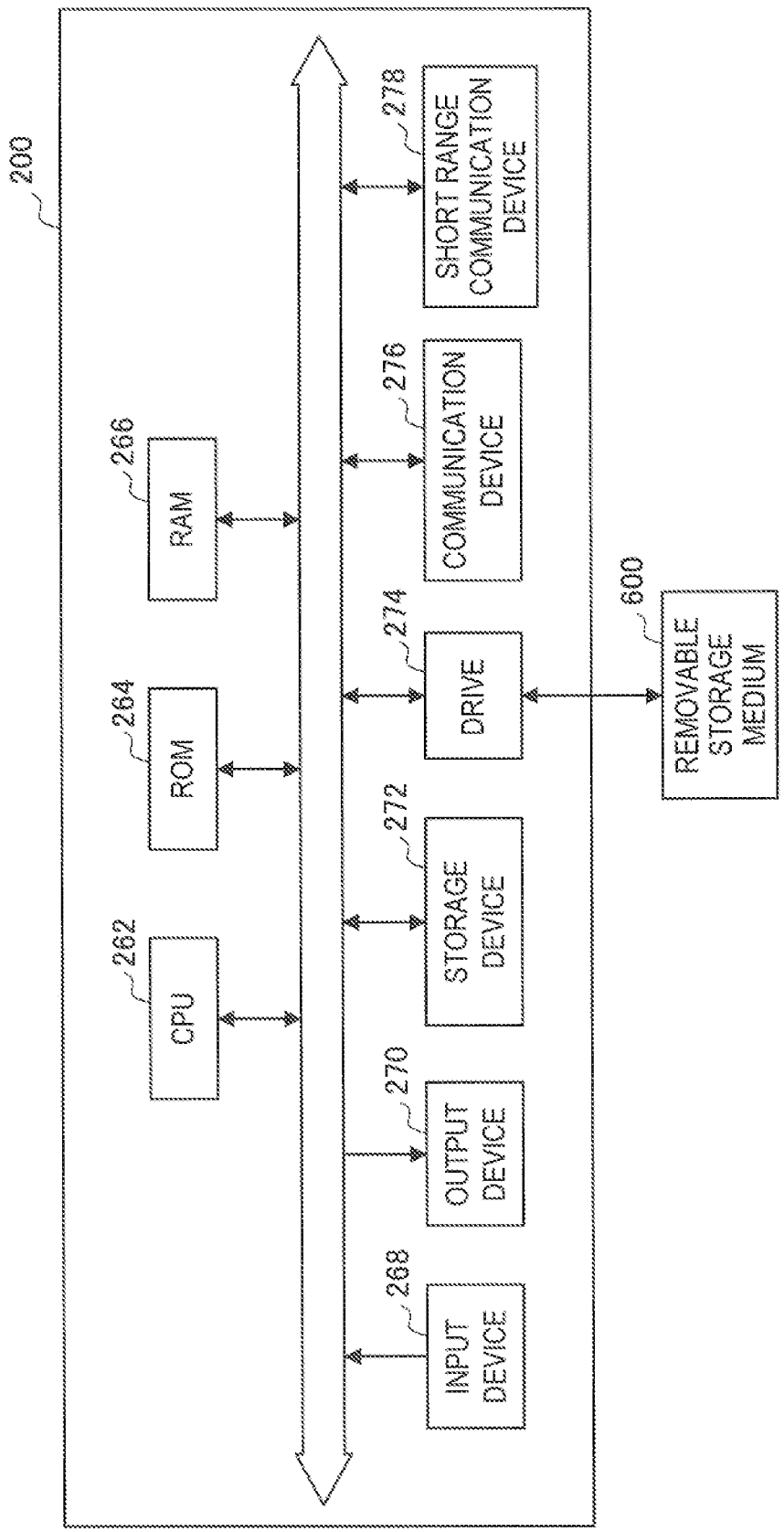
FIG. 13 is a block diagram illustrating one example of a hardware configuration of the portable terminal according to the first to third embodiments.

FIG. 13 is a block diagram illustrating one example of a hardware configuration of the portable terminal 200 according to the first to third embodiments. As shown in FIG. 13, the portable terminal 200 includes a CPU (Central Processing Unit) 262, a ROM (Read Only Memory) 264, and a RAM (Random Access Memory) 266. Also, the portable terminal 200 includes an input device 268, an output device 270, a storage device 272, a drive 274, a communication device 276, and a short range communication device 278.

The CPU 262 functions as an arithmetic processing device and a control device, and controls general actions in the portable terminal 200 in accordance with various programs. Further, the CPU 262 may be a microprocessor. The ROM 264 stores programs, arithmetic parameters and the like for use by the CPU 262. The RAM 266 temporarily stores programs used in execution by the CPU 262, parameters changed as appropriate in the execution, and the like. These are mutually interconnected by a host bus composed of a CPU bus and others.

The input device 268 is composed of input means for the user to input information, such as a mouse, a keyboard, a touch panel, a button, a microphone, a switch, and a lever, and an input control circuit for generating an input signal based on input by the user and outputting it to the CPU 262. The user of the portable terminal 200 can input various types of data and instruct processing operations to the portable terminal 200 by manipulating the input device 268.

The output device 270 includes, for example, a display device such as a liquid crystal display (LCD) device, an OLED (Organic Light Emitting Diode) device, and a lamp. Further, the output device 270 includes a sound output device such as a speaker and headphones. For example, the display device displays generated images and the like. On the other hand, the sound output device converts sound data and the like to sound and outputs it.

The storage device 272 is a device for storing data, which is configured as one example of the storage unit of the portable terminal 200. The storage device 272 may include a storage medium, a recording device for recording data in the storage medium, a reading device for reading data from the storage medium, a deleting device for deleting data recorded in the storage medium, and others. This storage device 272 stores programs that the CPU 262 executes and various data.

The drive 274 is a storage medium reader writer, which is built in or externally attached to the portable terminal 200. The drive 274 reads information recorded in a removable storage medium 600 such as a magnetic disk, an optical disc, a magneto-optical disk, or a semiconductor memory, and outputs it to the RAM 266. Also, the drive 274 can write information in the removable storage medium 600.

The communication device 276 is a communication interface composed of a communication device and others for connecting to the network 400, for example. Further, the communication device 276 may be a wireless LAN (Local Area Network) compatible communication device, a LTE (Long Term Evolution) compatible communication device, or a wire communication device that executes communication by wire.

The short range communication device 278 is a device that executes short range communication (for example, NFC communication) with an external device. For example, the short range communication device 278 receives carrier wave transmitted from the reader/writer of the external device with the communication antenna, and transmits a reply signal based on the processing result of the processing in an IC chip of an internal organ. For example, the communication antenna is composed of a resonance circuit including a coil (an inductor) having a predetermined inductance and a capacitor having a predetermined electrostatic capacitance. The IC chip demodulates and processes a carrier signal on the basis of the received carrier wave, and transmits a reply signal from the communication antenna by load modulation.

The preferred embodiments of the present invention have been described above with reference to the accompanying drawings, whilst the present invention is not limited to the above examples, of course. A person skilled in the art may find various alterations and modifications within the scope of the appended claims, and it should be understood that they will naturally come under the technical scope of the present invention.

In the above embodiments, a smartphone is taken as an example of the communication device, but it is not limited thereto. For example, the communication device may be a PDA, a gaming machine, an electronic dictionary, a notebook personal computer, and the like, with short range communication and wireless communication.

Also, in the above embodiment, NFC (Near Field Communication) communication is taken as an example of the short range communication, but it is not limited thereto. For example, the short range communication may be Bluetooth. Also, in the above, the communication device (portable terminal 200) executes the wireless communication with the payment server, but is not limited thereto. For example, the communication device (portable terminal 200) may execute wired communication with the payment server to transmit and receive the payment data.

Also, the steps illustrated in the flowchart of the above embodiments includes processing executed sequentially in the order of description, as well as processing not necessarily executed sequentially but executed parallelly or independently. Also, it is needless to say that the order of the sequentially executed steps may be changed as appropriate depending on the situation.

The processing by the information processing device described in the present specification may be realized using any of software, hardware, and a combination of software and hardware. A program that configures the software is contained in advance, for example, in the storage medium provided inside or outside each device. Then, each program is, for example, read into the RAM (Random Access Memory) at the time of execution, and executed by a processor such as the CPU.

Additionally, the present technology may also be configured as below.

(1)

A payment processing system for executing payment processing by transmitting and receiving payment data between a payment terminal and a payment server via a communication device, the payment terminal not including a dedicated network device for communication with the payment server, the payment data including at least payment amount information and service information to which a payment is to be executed, wherein the payment terminal includes a payment data generation section configured to generate first payment data in which the payment amount information is encrypted, and a terminal communication unit configured to transmit the generated first payment data to the communication device by short range communication, wherein the communication device includes a first device communication unit configured to receive the first payment data from the payment terminal by the short range communication, and a second device communication unit configured to transmit second payment data based on the first payment data received from the payment terminal, via a network to the payment server, wherein the payment server includes a server communication unit configured to receive the second payment data from the communication device via the network, and a payment processing section configured to decode the second payment data received from the communication device and execute payment processing, wherein the server communication unit transmits third payment data including at least balance information encrypted after payment, via the network to the communication device, wherein the first device communication unit transmits, to the payment terminal by the short range communication, fourth payment data based on the third payment data after payment which is received from the payment server by the second device communication unit.

(2)

The payment processing system according to (1), wherein the communication device further includes a device data processing section configured to generate the second payment data which is to be transmitted to the payment server, using the first payment data received by the first device communication unit, and the second device communication unit transmits the second payment data generated by the device data processing section, to the payment server.

(3)

The payment processing system according to (2), wherein the first payment data transmitted from the payment terminal to the communication device includes list information of a plurality of payable services without encryption, and the device data processing section generates the second payment data by replacing the list information with one-service information to which a payment is to be executed by the payment server.

(4)

The payment processing system according to (2) or (3), wherein the device data processing section adds device additional information which is to be processed in the payment server, to the generated second payment data without encryption, and the payment server executes processing associated with the device additional information, during payment processing based on the second payment data received from the communication device.

(5)

The payment processing system according to any one of (1) to (4), wherein the communication device further includes a device data processing section configured to generate the fourth payment data which is to be transmitted to the payment terminal, using the third payment data after payment which is received by the second device communication unit, and the first device communication unit transmits the fourth payment data generated by the device data processing section, to the payment terminal.

(6)

The payment processing system according to (5), wherein the device data processing section adds device additional information which is to be processed in the payment terminal, to the generated fourth payment data without encryption, and the payment terminal executes processing associated with the device additional information of the fourth payment data received from the communication device.

(7)

The payment processing system according to any one of (1) to (6), wherein the third payment data transmitted from the payment server to the communication device includes server additional information which is to be processed in the communication device, without encryption, and the communication device executes processing associated with the server additional information of the third payment data received from the payment server.

(8)

The payment processing system according to any one of (1) to (7), wherein the first payment data transmitted from the payment terminal to the communication device includes terminal additional information which is to be processed in the communication device, without encryption, and the communication device executes processing associated with the terminal additional information of the first payment data received from the payment terminal.

(9)

The payment processing system according to any one of (1) to (8), wherein a value storage unit storing a value of a payable service is connected to the payment server, and the payment processing section executes payment processing with respect to the value of the service stored in the value storage unit and associated with the service information included in the second payment data received from the communication device.

(10)

The payment processing system according to any one of (1) to (8), wherein a value storage unit storing a value of a payable service is provided in the communication device, and the payment processing section executes payment processing with respect to the value of the service stored in the value storage unit and associated with the service information included in the second payment data received from the communication device.

(11)

The payment processing system according to any one of (1) to (8), wherein a value storage unit storing a value of a payable service is provided in an external device configured to execute short range communication with the communication device, and the payment processing section executes payment processing with respect to the value of the service stored in the value storage unit and associated with the service information included in the second payment data received from the communication device.

(12)

A payment terminal in a payment processing system for executing payment processing, the payment terminal being configured to transmit payment data to and receive payment data from a payment server via a communication device, the payment terminal not including a dedicated network device for communication with the payment server, the payment data including at least payment amount information and service information to which a payment is to be executed, the payment terminal including:

a payment data generation section configured to generate first payment data in which the payment amount information is encrypted; and a terminal communication unit configured to transmit the generated first payment data to the communication device by short range communication, wherein, after the payment server receives second payment data based on the first payment data from the communication device, decodes the second payment data, and executes payment processing, the terminal communication unit receives fourth payment data based on third payment data including at least encrypted balance information, from the communication device by the short range communication.

(13)

A communication device in a payment processing system for executing payment processing, the communication device being configured to transmit and receive payment data between a payment terminal and a payment server, the payment terminal not including a dedicated network device for communication with the payment server, the payment data including at least payment amount information and service information to which a payment is to be executed, the communication device including:

a first device communication unit configured to receive first payment data generated by encrypting the payment amount information at the payment terminal, from the payment terminal by short range communication; and a second device communication unit configured to transmit second payment data based on the first payment data received from the payment terminal, via a network to the payment server, wherein, after the payment server decodes the transmitted second payment data and executes payment processing, the second device communication unit receives third payment data including at least encrypted balance information via the network from the payment server, wherein the first device communication unit transmits fourth payment data based on the third payment data received from the payment server, to the payment terminal by the short range communication.

(14)

A payment server in a payment processing system for executing payment processing, the payment server being configured to transmit payment data to and receive payment data from a payment terminal via a communication device, the payment terminal not including a dedicated network device for communication with the payment server, the payment data including at least payment amount information and service information to which a payment is to be executed, the payment server including:

a server communication unit configured to receive second payment data based on first payment data generated by encrypting the payment amount information at the payment terminal, from the communication device via a network; and a payment processing section configured to decode the second payment data received from the communication device and execute payment processing, wherein the server communication unit transmits third payment data including at least balance information encrypted after payment, via the network to the communication device.

(15)

A payment processing method for executing payment processing by transmitting and receiving payment data including at least payment amount information and service information to which a payment is to be executed, via a communication device between a payment server and a payment terminal not including a dedicated network device for communication with the payment server, the payment processing method including:

generating, by the payment terminal, first payment data in which the payment amount information is encrypted;

transmitting, by the payment terminal, the generated first payment data to the communication device by short range communication;

transmitting, by the communication device, second payment data based on the first payment data received from the payment terminal by the short range communication, via a network to the payment server;

decoding, by the payment server, the second payment data received from the communication device via the network, and executing payment processing;

transmitting, by the payment server, third payment data including at least balance information encrypted after payment via the network to the communication device; and transmitting, by the communication device, fourth payment data based on the third payment data received from the payment server, to the payment terminal by the short range communication.

(16)

A payment processing method for executing payment processing by transmitting and receiving payment data including at least payment amount information and service information to which a payment is to be executed, via a communication device between a payment server and a payment terminal not including a dedicated network device for communication with the payment server, the payment processing method including:

receiving, by the communication device, first payment data generated by encrypting the payment amount information at the payment terminal, from the payment terminal by short range communication;

transmitting, by the communication device, second payment data based on the first payment data received from the payment terminal, via a network to the payment server;

receiving, by the communication device, third payment data including at least encrypted balance information via the network from the payment server, after the payment server decodes the transmitted second payment data and executes payment processing; and transmitting, by the communication device, fourth payment data based on the third payment data received from the payment server, to the payment terminal by the short range communication.

REFERENCE SIGNS LIST

10, 20, 30 payment processing system
100 payment terminal
118 short range communication unit
120 payment data generation section
122 signature verification section
200 portable terminal
218 short range communication unit 220 wireless communication unit
222 payment data processing section
300 payment server
318 wireless communication unit
320 signature verification section
322 payment processing section
324 payment data processing section
400 network
500 IC card

The invention claimed is:

1. A payment processing system, comprising:
a payment terminal;
a communication device; and
a payment server, wherein
the payment terminal includes:
  a terminal communication unit; and
  at least one first processor configured to:
    encrypt first data based on a server key of the payment server, wherein
      the encrypted first data includes encrypted payment amount information and an encrypted terminal identifier (ID), and
      the encrypted terminal ID is an ID of the payment terminal;
    generate first payment data that includes the encrypted first data and second data, wherein
      the second data includes list information which indicates a list of a plurality of service IDs, and
      the list information is unencrypted; and
    control the terminal communication unit to:
      transmit the first payment data to the communication device by short range communication; and
      communicate with the payment server via the communication device,
the communication device includes:
  a display screen;
  a first device communication unit;
  a second device communication unit;
  a value storage unit configured to store a value of a payable service associated with each service ID of the plurality of service IDs; and
  at least one second processor configured to:
    control the first device communication unit to receive the first payment data from the payment terminal by the short range communication;
    control, based on the received first payment data, the display screen to display the list of the plurality of service IDs of the first payment data;
    select a service ID from the displayed list of the plurality of service IDs of the first payment data based on a user operation;
    replace the list of the plurality of service IDs of the first payment data with the selected service ID;
    generate second payment data based on the replacement of the list of the plurality of service IDs of the first payment data with the selected service ID; and
    control the second device communication unit to transmit the generated second payment data to the payment server over a network, wherein
      the generated second payment data comprises the encrypted first data and third data, and
      the third data includes the selected service ID and an ID of a social utility site, and
the payment server includes:
  a server communication unit; and
  at least one third processor configured to:
    control the server communication unit to receive the second payment data from the communication device over the network;
    decode the encrypted first data in the second payment data received from the communication device, wherein the encrypted first data is decoded based on the server key of the payment server;
    authenticate the payment terminal based on the decoded first data, wherein the decoded first data includes the ID of the payment terminal;
    execute a payment process based on the decoded first data, the third data, and the value of the payable service associated with the selected service ID;
    generate third payment data based on the decoded first data, the third data, and the execution of the payment process, wherein the third payment data includes balance information;
    encrypt the third payment data with a payment terminal key of the payment terminal; and
    control the server communication unit to transmit the encrypted third payment data to the communication device over the network, wherein
      the at least one second processor is further configured to:
        control the second device communication unit to receive the encrypted third payment data from the server communication unit;
        generate fourth payment data based on the received third payment data; and
        control the first device communication unit to transmit the fourth payment data to the payment terminal by the short range communication, and
      the at least one first processor is further configured to:
        verify a signature of the payment server in the transmitted fourth payment data; and
        confirm the execution of the payment process based on the verified signature of the payment server.

2. The payment processing system according to claim 1, wherein
the at least one second processor is further configured to add device additional information to the generated second payment data,
the device additional information is unencrypted,
the at least one third processor is further configured to execute a process associated with the device additional information, and
the execution of the process is based on the execution of the payment process and the second payment data received from the communication device.

3. The payment processing system according to claim 1, wherein the generation of the fourth payment data is based on the execution of the payment process and the third payment data.

4. The payment processing system according to claim 3, wherein
the at least one second processor is further configured to add device additional information to the fourth payment data,
the device additional information is unencrypted, and
the at least one first processor is further configured to execute a process associated with the device additional information of the fourth payment data received from the communication device.

5. The payment processing system according to claim 1, wherein
the third payment data transmitted from the payment server to the communication device includes server additional information,
the server additional information is unencrypted, and
the at least one second processor is configured to execute a process associated with the server additional information of the third payment data received from the payment server.

6. The payment processing system according to claim 1, wherein
the first payment data transmitted from the payment terminal to the communication device includes terminal additional information,
the terminal additional information is unencrypted, and
the at least one second processor is further configured to execute a process associated with the terminal additional information of the first payment data received from the payment terminal.

7. A payment terminal, comprising:
a terminal communication unit; and
at least one first processor configured to:
  encrypt first data based on a server key of a payment server, wherein
    the encrypted first data includes encrypted payment amount information and an encrypted terminal identifier (ID), and
    the encrypted terminal ID is an ID of the payment terminal;
  generate first payment data that includes the encrypted first data and second data, wherein
    the second data includes list information which indicates a list of a plurality of service IDs, and
    the list information is unencrypted;
  control the terminal communication unit to:
    transmit the first payment data to a communication device by short range communication; and
    communicate with the payment server via the communication device, wherein
      the communication device includes:
        a display screen;
        a first device communication unit;
        a second device communication unit;
        a value storage unit that stores a value of a payable service associated with each service ID of the plurality of service IDs; and
        at least one second processor that:
          controls the first device communication unit to receive the first payment data from the payment terminal by the short range communication;
          controls, based on the received first payment data, the display screen to display the list of the plurality of service IDs of the first payment data;
          selects a service ID from the displayed list of the plurality of service IDs of the first payment data based on a user operation;
          replaces the list of the plurality of service IDs of the first payment data with the selected service ID;
          generates second payment data based on the replacement of the list of the plurality of service IDs of the first payment data with the selected service ID; and
          controls the second device communication unit to transmit the generated second payment data to the payment server over a network,
          the generated second payment data includes the encrypted first data and third data,
          the third data includes the selected service ID and an ID of a social utility site,
          the payment server includes:
            a server communication unit; and
            at least one third processor that:
              controls the server communication unit to receive the second payment data from the communication device over the network;
              decodes the encrypted first data in the second payment data received from the communication device, wherein the encrypted first data is decoded based on the server key of the payment server;
              authenticates the payment terminal based on the decoded first data, wherein the decoded first data includes the ID of the payment terminal;
              executes a payment process based on the decoded first data, the third data, and the value of the payable service associated with the selected service ID;
              generates third payment data based on the first data, the third data, and the execution of the payment process, wherein the third payment data includes balance information;
              encrypts the third payment data with a payment terminal key of the payment terminal; and
              controls the server communication unit to transmit the encrypted third payment data to the communication device over the network, and
          the at least one second processor further:
            controls the second device communication unit to receive the encrypted third payment data from the server communication unit;
            generates fourth payment data based on the received third payment data; and
            controls the first device communication unit to transmit the fourth payment data to the payment terminal by the short range communication;
  receive the fourth payment data from the communication device by the short range communication;
  verify a signature of the payment server in the received fourth payment data; and
  confirm the execution of the payment process based on the verified signature of the payment server.

8. A communication device, comprising:
a display screen;
a first device communication unit;
a second device communication unit;
a value storage unit configured to store a value of a payable service associated with each service ID of a plurality of service IDs of first payment data; and
at least one first processor configured to:
  control the first device communication unit to receive the first payment data from a payment terminal by short range communication;
  control, based on the received first payment data, the display screen to display the list of the plurality of service IDs of the first payment data;
  select a service ID from the displayed list of the plurality of service IDs of the first payment data based on a user operation, wherein at least one second processor of the payment terminal:

29 encrypts first data based on a server key of a payment
server, wherein
the encrypted first data includes encrypted payment amount information and an encrypted terminal identifier (ID), and
the encrypted terminal ID is an ID of the payment terminal;
generates the first payment data that includes the encrypted first data and second data, wherein
the second data includes list information which indicates the list of the plurality of service IDs, and
the list information is unencrypted; and
controls a terminal communication unit of the payment terminal to:
transmit the first payment data to the communication device by the short range communication; and
communicate with the payment server via the communication device;
replace the list of the plurality of service IDs of the first payment data with the selected service ID;
generate second payment data based on the replacement of the list of the plurality of service IDs of the received first payment data with the selected service ID;
control the second device communication unit to transmit the generated second payment data to the payment server over a network, wherein
the generated second payment data includes the encrypted first data and third data,
the third data includes the selected service ID and an ID of a social utility site, and
at least one third processor of the payment server:
controls a server communication unit of the payment server to receive the second payment data from the communication device over the network;
decodes the encrypted first data in the second payment data received from the communication device, wherein the encrypted first data is decoded based on the server key of the payment server;
authenticates the payment terminal based on the decoded first data, wherein the decoded first data includes the ID of the payment terminal;
executes a payment process based on the decoded first data, the third data, and the value of the payable service associated with the selected service ID;
generates third payment data based on the decoded first data, the third data, and the execution of the payment process, wherein the third payment data includes balance information;
encrypts the third payment data with a payment terminal key of the payment terminal; and
controls the server communication unit to transmit the encrypted third payment data to the communication device over the network;
control the second device communication unit to receive the encrypted third payment data from the server communication unit;
generate fourth payment data based on the received third payment data; and
control the first device communication unit to transmit the fourth payment data to the payment terminal by the short range communication, wherein

30 the at least one second processor further:
verifies a signature of the payment server in the transmitted fourth payment data; and
confirms the execution of the payment process based on the verified signature of the payment server.

9. A payment server, comprising:
a server communication unit; and
at least one first processor configured to:
control the server communication unit to receive first payment data from a communication device over a network;
communicate with a payment terminal via the communication device, wherein
the payment terminal includes at least one second processor that:
encrypts first data based on a server key of the payment server, wherein
the encrypted first data includes encrypted payment amount information and an encrypted terminal identifier (ID), and
the encrypted terminal ID is an ID of the payment terminal;
generates second payment data that includes the encrypted first data and second data, wherein
the second data includes list information which indicates a list of a plurality of service IDs, and
the list information is unencrypted; and
controls a terminal communication unit of the payment terminal to transmit the second payment data to the communication device by short range communication, and
the communication device includes:
a display screen;
a first device communication unit;
a second device communication unit;
a value storage unit configured to store a value of a payable service associated with each service ID of the plurality of service IDs; and
at least one third processor that:
controls the first device communication unit to receive the second payment data from the payment terminal by the short range communication;
controls, based on the received second payment data, the display screen to display the list of the plurality of service IDs of the second payment data;
selects a service ID from the displayed list of the plurality of service IDs of the second payment data based on a user operation;
replaces the list of the plurality of service IDs of the second payment data with the selected service ID;
generates the first payment data based on the replacement of the list of the plurality of service IDs of the second payment data with the selected service ID; and
controls the second device communication unit to transmit the generated first payment data to the payment server over the network, wherein
the generated first payment data comprises the encrypted first data and third data, and
the third data includes the selected service ID and an ID of a social utility site;
decode the encrypted first data in the first payment data received from the communication device, wherein the encrypted first data is decoded based on the server key of the payment server;
authenticate the payment terminal based on the decoded first data, wherein the decoded first data includes the ID of the payment terminal;
execute a payment process based on the decoded first data, the third data, and the value of the payable service associated with the selected service ID;
generate third payment data based on the decoded first data, the third data, and the execution of the payment process, wherein the third payment data includes balance information;
encrypt the third payment data with a payment terminal key of the payment terminal; and
control the server communication unit to transmit the encrypted third payment data to the communication device over the network, wherein
the at least one third processor further:
controls the second device communication unit to receive the encrypted third payment data from the server communication unit;
generates fourth payment data based on the received third payment data; and
controls the first device communication unit to transmit the fourth payment data to the payment terminal by the short range communication, and
the at least one second processor further:
verifies a signature of the payment server in the transmitted fourth payment data; and
confirms the execution of the payment process based on the verified signature of the payment server.

10. A payment processing method, comprising:
encrypting, by at least one first processor of a payment terminal, first data based on a server key of a payment server, wherein
the encrypted first data includes encrypted payment amount information and an encrypted terminal identifier (ID), and
the encrypted terminal ID is an ID of the payment terminal;
generating, by the at least one first processor, first payment data that includes the encrypted first data and second data, wherein
the second data includes list information which indicates a list of a plurality of service IDs, and
the list information is unencrypted;
controlling, by the at least one first processor, a terminal communication unit of the payment terminal to:
transmit the first payment data to a communication device by short range communication; and
communicate with the payment server via the communication device;
controlling, by at least one second processor of the communication device, a first device communication unit of the communication device to receive the first payment data from the payment terminal by the short range communication;
controlling, by the at least one second processor based on the received first payment data, a display screen of the communication device to display the list of the plurality of service IDs of the first payment data;
selecting, by the at least one second processor, a service ID from the displayed list of the plurality of service IDs of the first payment data based on a user operation;
replacing, by the at least one second processor, the list of the plurality of service IDs of the first payment data with the selected service ID;
generating, by the at least one second processor, second payment data based on the replacement of the list of the plurality of service IDs of the first payment data with the selected service ID;
controlling, by the at least one second processor, a second device communication unit of the communication device to transmit the generated second payment data to the payment server over a network, wherein
the generated second payment data comprises the encrypted first data and third data, and
the third data includes the selected service ID and an ID of a social utility site;
controlling, by at least one third processor of the payment server, a server communication unit of the payment server to receive the second payment data from the communication device over the network;
decoding, by the at least one third processor, the second payment data received from the communication device over the network, wherein the encrypted first data is decoded based on the server key of the payment server;
authenticating, by the at least one third processor, the payment terminal based on the decoded first data, wherein the decoded first data includes the ID of the payment terminal;
executing, by the at least one third processor, a payment process based on the decoded first data, the third data, and a value of a payable service associated with the selected service ID, wherein the communication device includes a value storage unit configured to store the value of the payable service associated with each service ID of the plurality of service IDs of the first payment data;
generating, by the at least one third processor, third payment data based on the decoded first data, the third data, and the execution of the payment process, wherein the third payment data includes balance information;
encrypting, by the at least one third processor, the third payment data with a payment terminal key of the payment terminal;
controlling, by the at least one third processor, the server communication unit to transmit the encrypted third payment data to the communication device over the network;
controlling, by the at least one second processor, the second device communication unit to receive the encrypted third payment data from the server communication unit;
generating, by the at least one second processor, fourth payment data based on the received third payment data;
controlling, by the at least one second processor, the first device communication unit to transmit the fourth payment data to the payment terminal by the short range communication;
verifying, by the at least one first processor, a signature of the payment server in the transmitted fourth payment data; and
confirming, by the at least one first processor, the execution of the payment process based on the verified signature of the payment server.

* * * * *